US012512222B2

(12) United States Patent
El-Baz et al.

(10) Patent No.: US 12,512,222 B2
(45) Date of Patent: Dec. 30, 2025

(54) ASSESSMENT OF PULMONARY FUNCTION IN CORONAVIRUS PATIENTS

(71) Applicant: University of Louisville Research Foundation, Inc., Louisville, KY (US)

(72) Inventors: Ayman S. El-Baz, Louisville, KY (US); Mohamed Elsharkawy, Louisville, KY (US); Ahmed Sharafeldeen, Louisville, KY (US); Ahmed Shalaby, Louisville, KY (US); Ahmed Soliman, Louisville, KY (US); Ali Mahmoud, Louisville, KY (US); Harpal Sandhu, Louisville, KY (US); Guruprasad A. Giridharan, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 259 days.

(21) Appl. No.: 18/182,221

(22) Filed: Mar. 10, 2023

(65) Prior Publication Data
US 2023/0230705 A1    Jul. 20, 2023

Related U.S. Application Data

(63) Continuation-in-part of application No. 17/685,493, filed on Mar. 3, 2022, now Pat. No. 12,217,432.
(Continued)

(51) Int. Cl.
*G16H 50/20* (2018.01)
*G06T 7/00* (2017.01)
*G06T 7/11* (2017.01)

(52) U.S. Cl.
CPC .......... *G16H 50/20* (2018.01); *G06T 7/0012* (2013.01); *G06T 7/11* (2017.01); *G06T 2207/30061* (2013.01)

(58) Field of Classification Search
None
See application file for complete search history.

(56) References Cited

U.S. PATENT DOCUMENTS

| | | | |
|---|---|---|---|
| 2008/0002870 A1* | 1/2008 | Farag | G06V 10/761 382/209 |
| 2019/0027252 A1* | 1/2019 | Calhoun | G06T 7/0012 |
| 2021/0035287 A1* | 2/2021 | Kim | G06N 3/08 |

OTHER PUBLICATIONS

Munro, Paul. "Backpropagation." <i>Encyclopedia of Cognitive Science</i>, by L. Nadel, 1st ed., Wiley, 2005. <i>Credo Reference</i>, https://search.credoreference.com/articles/Qm9va0FydGljbGU6Mjg2NDU3?aid=279753.</div> (Year: 2005).*

(Continued)

*Primary Examiner* — Amandeep Saini
*Assistant Examiner* — Caroline Tabancay Duffy
(74) *Attorney, Agent, or Firm* — Dentons Bingham Greenebaum LLP; Brian W. Chellgren

(57) ABSTRACT

Assessment of pulmonary function in coronavirus patients includes use of a computer aided diagnostic system to assess pulmonary function and risk of mortality in patents with coronavirus disease 2019. The CAD system processes thoracic X-ray data from a patient, extracts imaging markers, and grades disease severity based at least in part on the extracted imaging markers, thereby distinguishing between higher risk and lower risk patients. An alternative approach is to use an automatic CAD system to grade COVID-19 from computed tomography (CT) images to determine an accurate diagnosis of lung function.

18 Claims, 23 Drawing Sheets
(6 of 23 Drawing Sheet(s) Filed in Color)

Related U.S. Application Data

(60) Provisional application No. 63/156,171, filed on Mar. 3, 2021.

(56) References Cited

OTHER PUBLICATIONS

Hara, Kensho, Hirokatsu Kataoka, and Yutaka Satoh. "Learning spatio-temporal features with 3d residual networks for action recognition." Proceedings of the IEEE international conference on computer vision workshops. 2017. (Year: 2017).*

Zhang, K., et al. (2020). Clinically Applicable AI System for Accurate Diagnosis, Quantitative Measurements, and Prognosis of COVID-19 Pneumonia Using Computed Tomography. Cell, 181(6), 1423-1433.e11. https://doi.org/10.1016/j.cell.2020.04.045 (Year: 2020).*

Wang, X., Deng, X., Fu, Q., Zhou, Q., Feng, J., Ma, H., Liu, W., & Zheng, C. (2020). A Weakly-Supervised Framework for COVID-19 Classification and Lesion Localization From Chest CT. IEEE Transactions on Medical Imaging, 39(8), 2615-2625. https://doi.org/10.1109/TMI.2020.2995965 (Year: 2020).*

Wang C., Horby P.W., Hayden F.G., Gao G.F. A novel coronavirus outbreak of global health concern. Lancet. 2020;395:470-473. doi: 10.1016/S0140-6736(20)30185-9.

World Health Organization . Transmission of SARS-CoV-2: Implications for Infection Prevention Precautions: Scientific Brief, Jul. 9, 2020. World Health Organization; Geneva, Switzerland: 2020. Technical Report.

Xu M., Wang D., Wang H., Zhang X., Liang T., Dai J., Li M., Zhang J., Zhang K., Xu D., et al. COVID-19 diagnostic testing: Technology perspective. Clin. Transl. Med. 2020;10:e158. doi: 10.1002/ctm2.158.

COVID-19 Pandemic Planning Scenarios. [(accessed on Dec. 30, 2021)];2021 Available online: https://www.cdc.gov/coronavirus/2019-ncov/hcp/planning-scenarios.html.

Coronavirus Cases. 2021. [(accessed on Jan. 3, 2022)]. Available online: https://www.worldometers.info/coronavirus/.

Moghanloo E., Rahimi-Esboei B., Mahmoodzadeh H., Hadjilooei F., Shahi F., Heidari S., Almassian B. Different Behavioral Patterns of SARS-CoV-2 in Patients with Various Types of Cancers: A Role for Chronic Inflammation Induced by Macrophages [Preprint] 2021. [(accessed on Dec. 15, 2021)]. Available online: https://www.researchsquare.com/article/rs-238224/v1.

Elsharkawy M., Sharafeldeen A., Taher F., Shalaby A., Soliman A., Mahmoud A., Ghazal M., Khalil A., Alghamdi N.S., Razek A.A.K.A., et al. Early assessment of lung function in coronavirus patients using invariant markers from chest X-rays images. Sci. Rep. 2021;11:1-11. doi: 10.1038/s41598-021-91305-0.

Zu Z.Y., Jiang M.D., Xu P.P., Chen W., Ni Q.Q., Lu G.M., Zhang L.J. Coronavirus disease 2019 (COVID-19): A perspective from China. Radiology. 2020;296:E15-E25. doi: 10.1148/radiol.2020200490.

Bernheim A., Mei X., Huang M., Yang Y., Fayad Z.A., Zhang N., Diao K., Lin B., Zhu X., Li K., et al. Chest CT findings in coronavirus disease-19 (COVID-19): Relationship to duration of infection. Radiology. 2020;295:200463. doi: 10.1148/radiol.2020200463.

Li M., Lei P., Zeng B., Li Z., Yu P., Fan B., Wang C., Li Z., Zhou J., Hu S., et al. Coronavirus disease (COVID-19): Spectrum of CT findings and temporal progression of the disease. Acad. Radiol. 2020;27:603-608. doi: 10.1016/j.acra.2020.03.003.

Lehmann T., Gonner C., Spitzer K. Survey: Interpolation methods in medical image processing. IEEE Trans. Med. Imaging. 1999;18:1049-1075. doi: 10.1109/42.816070.

Barstugan M., Ozkaya U., Ozturk S. Coronavirus (COVID-19) Classification using CT Images by Machine Learning Methods. arXiv. 20202003.09424.

Ardakani A.A., Acharya U.R., Habibollahi S., Mohammadi A. COVIDiag: A clinical CAD system to diagnose COVID-19 pneumonia based on CT findings. Eur. Radiol. 2021;31:121-130. doi: 10.1007/s00330-020-07087-y.

Zhang Y., Wu H., Song H., Li X., Suo S., Yin Y., Xu J. COVID-19 Pneumonia Severity Grading: Test of a Trained Deep Learning Model. 2020. [(accessed on Dec. 12, 2021)]. Available online: https://www.researchsquare.com/article/rs-29538/latest.pdf.

Ni Q., Sun Z.Y., Qi L., Chen W., Yang Y., Wang L., Zhang X., Yang L., Fang Y., Xing Z., et al. A deep learning approach to characterize 2019 coronavirus disease (COVID-19) pneumonia in chest CT images. Eur. Radiol. 2020;30:6517-6527. doi: 10.1007/s00330-020-07044-9.

Çiçek Ö., Abdulkadir A., Lienkamp S.S., Brox T., Ronneberger O. International Conference on Medical Image Computing and Computer-Assisted Intervention. Springer; Berlin/Heidelberg, Germany: 2016. 3D U-Net: Learning dense volumetric segmentation from sparse annotation; pp. 424-432.

Li Z., Zhang S., Zhang J., Huang K., Wang Y., Yu Y. International Conference on Medical Image Computing and Computer-Assisted Intervention. Springer; Berlin/Heidelberg, Germany: 2019. MVP-Net: Multi-view FPN with position-aware attention for deep universal lesion detection; pp. 13-21.

Goncharov M., Pisov M., Shevtsov A., Shirokikh B., Kurmukov A., Blokhin I., Chernina V., Solovev A., Gombolevskiy V., Morozov S., et al. Ct-based covid-19 triage: Deep multitask learning improves joint identification and severity quantification. Med. Image Anal. 2021;71:102054. doi: 10.1016/j.media.2021.102054.

Ghafoor K. COVID-19 Pneumonia Level Detection Using Deep Learning Algorithm. 2020. [(accessed on Jan. 1, 2022)]. Available online: https://www.techrxiv.org/articles/preprint/COVID-19_Pneumonia_Level_Dete . . . .

Shakarami A., Menhaj M.B., Tarrah H. Diagnosing COVID-19 disease using an efficient CAD system. Optik. 2021;241:167199. doi: 10.1016/j.ijleo.2021.167199.

Krizhevsky A., Sutskever I., Hinton G.E. ImageNet classification with deep convolutional neural networks. Commun. ACM. 2017;60:84-90. doi: 10.1145/3065386.

Zheng C., Deng X., Fu Q., Zhou Q., Feng J., Ma H., Liu W., Wang X. Deep learning-based detection for COVID-19 from chest CT using weak label. medRxiv. 2020 doi: 10.1101/2020.03.12.20027185.

Wang B., Jin S., Yan Q., Xu H., Luo C., Wei L., Zhao W., Hou X., Ma W., Xu Z., et al. AI-assisted CT imaging analysis for COVID-19 screening: Building and deploying a medical AI system. Appl. Soft Comput. 2021;98:106897. doi: 10.1016/j.asoc.2020.106897.

Zhou Z., Siddiquee M.M.R., Tajbakhsh N., Liang J. Deep Learning in Medical Image Analysis and Multimodal Learning for Clinical Decision Support. Springer International Publishing; Berlin/Heidelberg, Germany: 2018. UNet++: A Nested U-Net Architecture for Medical Image Segmentation; pp. 3-11.

Milletari F., Navab N., Ahmadi S.A. V-Net: Fully Convolutional Neural Networks for Volumetric Medical Image Segmentation; Proceedings of the 2016 Fourth International Conference on 3D Vision (3DV); Stanford, CA, USA. Oct. 25-28, 2016.

Long J., Shelhamer E., Darrell T. Fully convolutional networks for semantic segmentation; Proceedings of the 2015 IEEE Conference on Computer Vision and Pattern Recognition (CVPR); Boston, MA, USA. Jun. 7-12, 2015.

Szegedy C., Vanhoucke V., Ioffe S., Shlens J., Wojna Z. Rethinking the Inception Architecture for Computer Vision; Proceedings of the 2016 IEEE Conference on Computer Vision and Pattern Recognition (CVPR); Las Vegas, NV, USA. Jun. 27-30, 2016.

Chen Y., Li J., Xiao H., Jin X., Yan S., Feng J. Dual Path Networks. Adv. Neural Inf. Process. Syst. 2017;30:32.

Wang F., Jiang M., Qian C., Yang S., Li C., Zhang H., Wang X., Tang X. Residual Attention Network for Image Classification; Proceedings of the 2017 IEEE Conference on Computer Vision and Pattern Recognition (CVPR); Honolulu, Hi, USA. Jul. 21-26, 2017.

Sharafeldeen A., Elsharkawy M., Alghamdi N.S., Soliman A., El-Baz A. Precise Segmentation of COVID-19 Infected Lung from CT Images Based on Adaptive First-Order Appearance Model with Morphological/Anatomical Constraints. Sensors. 2021;21:5482. doi: 10.3390/s21165482.

Sharafeldeen A., Elsharkawy M., Khalifa F., Soliman A., Ghazal M., AlHalabi M., Yaghi M., Alrahmawy M., Elmougy S., Sandhu H.S., et al. Precise higher-order reflectivity and morphology models for

(56) References Cited

OTHER PUBLICATIONS early diagnosis of diabetic retinopathy using OCT images. Sci. Rep. 2021;11:4730. doi: 10.1038/s41598-021-83735-7.

Elsharkawy M., Sharafeldeen A., Soliman A., Khalifa F., Ghazal M., El-Daydamony E., Atwan A., Sandhu H.S., El-Baz A. A Novel Computer-Aided Diagnostic System for Early Detection of Diabetic Retinopathy Using 3D-OCT Higher-Order Spatial Appearance Model. Diagnostics. 2022; 12:461. doi: 10.3390/diagnostics12020461.

Ranganathan A. The levenberg-marquardt algorithm. Tutoral Algorithm. 2004; 11:101-110.

Biau G., Scornet E. A random forest guided tour. Test. 2016;25:197-227. doi: 10.1007/s11749-016-0481-7.

Loh W.Y. Classification and regression trees. Wiley Interdiscip. Rev. 2011;1:14-23. doi: 10.1002/widm.8.

Murphy K.P. Naive bayes classifiers. Univ. Br. Columbia. 2006; 18:1-8.

Noble W.S. What is a support vector machine? Nat. Biotechnol. 2006;24:1565-1567. doi: 10.1038/nbt1206-1565.

Guo G., Wang H., Bell D., Bi Y., Greer K. OTM Confederated International Conferences "On the Move to Meaningful Internet Systems". Springer; Berlin/Heidelberg, Germany: 2003. KNN model-based approach in classification; pp. 986-996.

Song Y., Zheng S., Li L., Zhang X., Zhang X., Huang Z., Chen J., Wang R., Zhao H., Zha Y., et al. Deep learning Enables Accurate Diagnosis of Novel Coronavirus (COVID-19) with CT images. IEEE/ACM Trans. Comput. Biol. Bioinform. 2021;18:2775-2780. doi: 10.1109/TCBB.2021.3065361.

Yang Z., Luo T., Wang D., Hu Z., Gao J., Wang L. Computer Vision-ECCV 2018. Springer International Publishing; Berlin/Heidelberg, Germany: 2018. Learning to Navigate for Fine-Grained Classification; pp. 438-454.

Farahat, I. et al. The Role of 3D CT Imaging in the Accurate Diagnosis of Lung Function in Coronavirus Patients. Mar. 12, 2022;12(3):696. doi: 10.3390/diagnostics12030696.

Jiang X., Coffee M., Bari A., Wang J., Jiang X., Huang J., Shi J., Dai J., Cai J., Zhang T., et al. Towards an artificial intelligence framework for data-driven prediction of coronavirus clinical severity. Comput. Mater. Contin. 2020;63:537-551. doi: 10.32604/cmc.2020.010691.

Marcos M., Belhassen-García M., Sánchez-Puente A., Sampedro-Gomez J., Azibeiro R., Dorado-Díaz P.I., Marcano-Millán E., García-Vidal C., Moreiro-Barroso M.T., Cubino-Bóveda N., et al. Development of a severity of disease score and classification model by machine learning for hospitalized COVID-19 patients. PLoS ONE. 2021; 16:e0240200. doi: 10.1371/journal.pone.0240200.

Ronneberger O., Fischer P., Brox T. Lecture Notes in Computer Science. Springer International Publishing; Berlin/Heidelberg, Germany: 2015. U-Net: Convolutional Networks for Biomedical Image Segmentation; pp. 234-241.

Wu X., Chen C., Zhong M., Wang J., Shi J. COVID-AL: The diagnosis of COVID-19 with deep active learning. Med. Image Anal. 2021;68:101913. doi: 10.1016/j.media.2020.101913.

Zhang K., Liu X., Shen J., Li Z., Sang Y., Wu X., Zha Y., Liang W., Wang C., Wang K., et al. Clinically applicable AI system for accurate diagnosis, quantitative measurements, and prognosis of COVID-19 pneumonia using computed tomography. Cell. 2020;181:1423-1433. doi: 10.1016/j.cell.2020.04.045.

Ardakani A.A., Kanafi A.R., Acharya U.R., Khadem N., Mohammadi A. Application of deep learning technique to manage COVID-19 in routine clinical practice using CT images: Results of 10 convolutional neural networks. Comput. Biol. Med. 2020;121:103795. doi: 10.1016/j.compbiomed.2020.103795.

He K., Zhang X., Ren S., Sun J. Deep Residual Learning for Image Recognition; Proceedings of the 2016 IEEE Conference on Computer Vision and Pattern Recognition (CVPR); Las Vegas, NV, USA. Jun. 27-30, 2016.

Chollet F. Xception: Deep Learning with Depthwise Separable Convolutions; Proceedings of the 2017 IEEE Conference on Computer Vision and Pattern Recognition (CVPR); Honolulu, Hi, USA. Jul. 21-26, 2017.

* cited by examiner

ASSESSMENT OF PULMONARY FUNCTION IN CORONAVIRUS PATIENTS

CROSS-REFERENCE TO RELATED APPLICATION

This application is a continuation-in-part application of U.S. utility application Ser. No. 17/685,493, filed Mar. 3, 2022, which claims the benefit of U.S. provisional patent application Ser. No. 63/156,171, filed Mar. 3, 2021, both incorporated herein by reference.

FIELD OF THE INVENTION

Assessment of pulmonary function in coronavirus patients includes use of a computer aided diagnostic (CAD) system to assess pulmonary function and risk of mortality in patents with coronavirus disease 2019 (COVID-19). The CAD system processes chest X-ray data from a patient, extracts imaging markers, and grades disease severity based at least in part on the extracted imaging markers, thereby distinguishing between higher risk and lower risk patients. An alternative approach is to use an automatic CAD system to grade COVID-19 from computed tomography (CT) images to determine an accurate diagnosis of lung function.

BACKGROUND OF THE INVENTION

COVID-19 is caused by a novel RNA virus belonging to the Coronaviridae family. Coronaviridae is a family of nonsegmented, enveloped, positive-sense, single-stranded ribonucleic acid viruses. Six species of coronavirus had previously been identified as pathogenic in humans: four of these cause mild respiratory illnesses, whereas the other two species, severe acute respiratory syndrome coronavirus (SARS-CoV) and Middle East respiratory syndrome coronavirus (MERS-CoV), have led to epidemics with significant rates of mortality.

The clinical diagnosis of COVID-19 depends on different symptoms including fever (98% of cases), dry cough (75%), fatigue (45%), muscle aches (45%), difficulty breathing (55%), and acute respiratory distress syndrome (ARDS) (20%). Severe cases may progress to multiorgan dysfunction and even death (2.5%). The disease may be classified as (i) mild type: moderate clinical symptoms with normal chest X-ray; (ii) typical type: fever, respiratory, and other clinical findings indicating signs of pneumonia; (iii) severe type: respiratory distress signs (respiratory rate 30 breaths per minute and/or blood oxygen saturation of less than 93%); or (iv) critical type: dysfunction of respiration necessitating mechanical ventilation, shock, and organ damage requiring monitoring and treatment from an intensive care unit (ICU).

Due to the wide variations in clinical presentation and progression rate for COVID-19, laboratory confirmation of SARSCoV-2 infection is essential to initiate appropriate early treatment and to prevent further spread of the disease. The current reference standard for this purpose is real-time reverse transcription polymerase chain reaction (PCR) of viral RNA. The PCR test, according to current guidelines, is run on samples from nasopharyngeal and/or throat swabs. While PCR is the gold standard in diagnosing patients with COVID-19 infection, the sensitivity of a single PCR is suboptimal and depends on the timing of the test, sampling sites and sampling techniques.

Chest radiography is helpful for first-line evaluation of patients with a high pre-test probability of overt COVID-19 pneumonia, clinical follow up, and for the evaluation of potential complications. Chest radiography can detect areas of ground glass density, also observed on chest computed tomography (CT), which may often have a correlation with the severity of the disease, and may be intermixed with reticular pattern.

Based on recent clinical research, COVID-19 radiological forms are variable in severity using plain radiography or CT, ranging from a normal chest (albeit rarely), to patchy involvement of one or both lungs in mild or moderate cases, to diffuse infiltration (white lung) in severe cases. This is an important issue, as mild or moderate cases can be managed by medical treatment or non-invasive ventilation, while severe cases with bilateral lung infection urgently need mechanical ventilation to support respiration as patients develop ARDS. Given the paucity of mechanical ventilation units, patient selection for ventilation plays a crucial role in saving lives.

There are few preliminary studies and case reports discussing the role of artificial intelligence (AI) on plain radiography and CT for early diagnosis of patients with COVID-19. AI can be used in conjunction with radiologists to improve the results of detection of COVID-19. AI can be a powerful aid in delineating and quantifying lesions in X-ray images and in tracking longitudinal changes between exams, which is crucial for precision medicine. In essence, AI is another means of analyzing data that clinicians can draw on to inform their judgment in issues of triage, diagnosis (in combination with PCR tests and epidemiological risk), prognosis, and selection between therapeutic alternatives in patients exhibiting COVID-19 symptoms. Plain radiography involves a low radiation dose compared to CT and is better suited for routine monitoring and follow up as compared to a CT scan. AI may be capable of detecting subtle changes in the lung visible on either chest X-ray or CT, and can improve efficiency by decreasing the amount of time to return test results. This is necessary for screening the general population during the current COVID-19 pandemic and in the epicenters of any future outbreaks. Computer assisted detection alleviates the burden on radiologists and clinicians and facilitates rapid triage. Also, AI can be used for the differentiation of previous lung injury unrelated to COVID-19 from advanced lung dysfunction due to COVID-19, and assist in patient selection for ventilation. However, CAD systems for assessing lung function in COVID-19 are limited in the literature.

X-ray images may be indicative of healthy lungs or evidence of pneumonia (bacterial or viral). Combined with prior information regarding the likelihood the patient has been exposed to the virus, an automatic diagnosis of viral pneumonia has a high true positive rate for detection of COVID-19. Currently, the primary challenge is to apply different AI-based approaches to determine the severity of chest infection in COVID-19 patients given that X-ray images vary enormously in image quality due to the wide range of X-ray machines in use across the world.

SUMMARY

To address the identified challenges, Applicant has developed a novel CAD system using AI and machine learning techniques to assist physicians by providing an objective metric that can differentiate severe cases of COVID-19 from mild/moderate non-severe cases. The CAD system addresses the challenge of X-ray image quality by generating a diagnosis at least in part on extracted X-ray image markers that are invariant under rotation, scaling, and translation, and that capture both local and global features of the lung. An alternative approach to the use of X-ray images is to use an automatic CAD system to grade COVID-19 from computed tomography (CT) images to determine an accurate diagnosis of lung function.

It will be appreciated that the various systems and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A better understanding of the present invention will be had upon reference to the following description in conjunction with the accompanying drawings.

FIG. 8 provides an illustrative example of the proposed segmentation approach for (a) healthy/mild, (b) moderate, and (c) severe COVID-19 infections. Note that the blue (green) border represents our segmentation (ground truth).

DETAILED DESCRIPTION OF THE PREFERRED EMBODIMENTS

Figure 1:
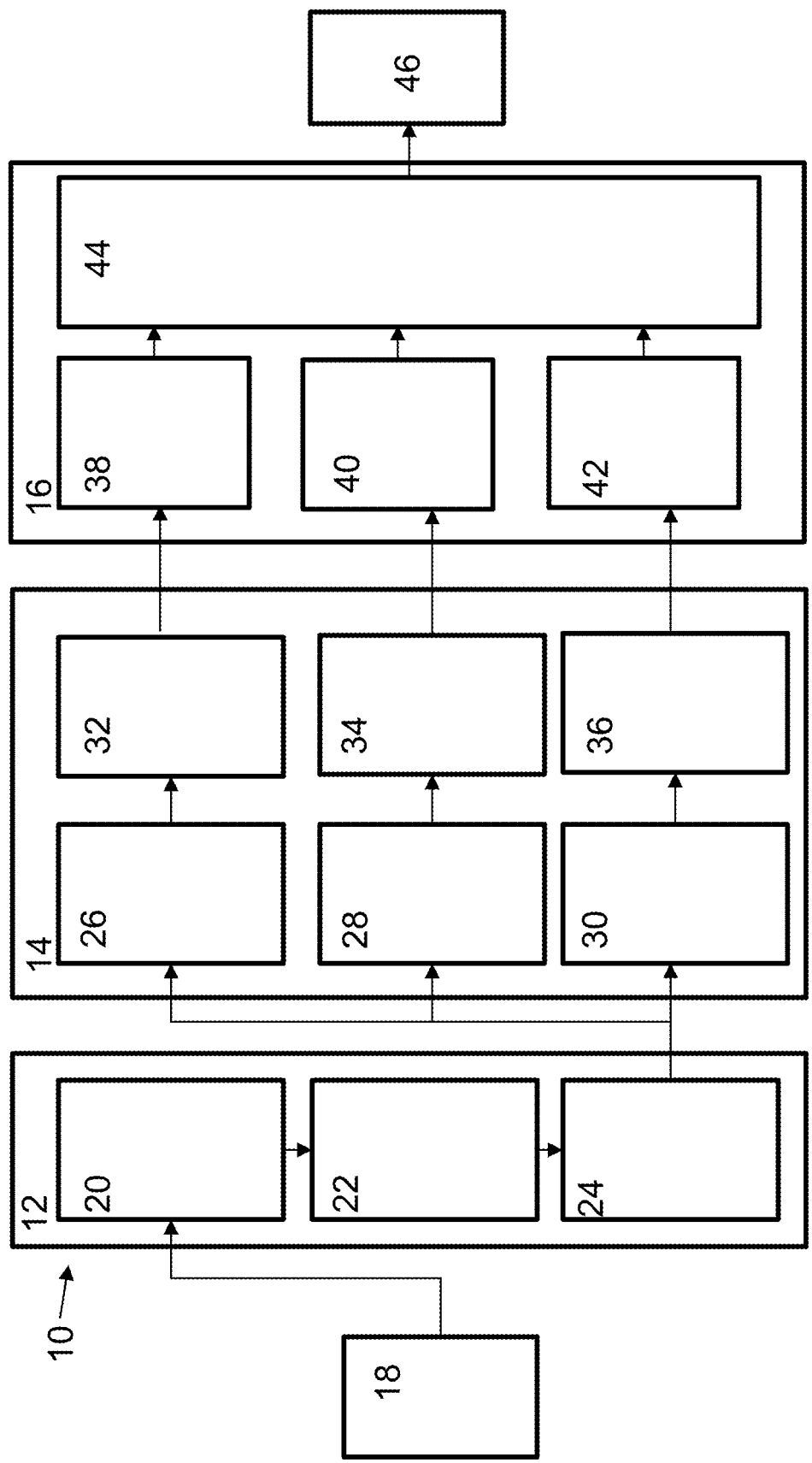
FIG. 1 is a diagram representing the methodology of the disclosed CAD system for assessment of pulmonary function.
Figure 2A:
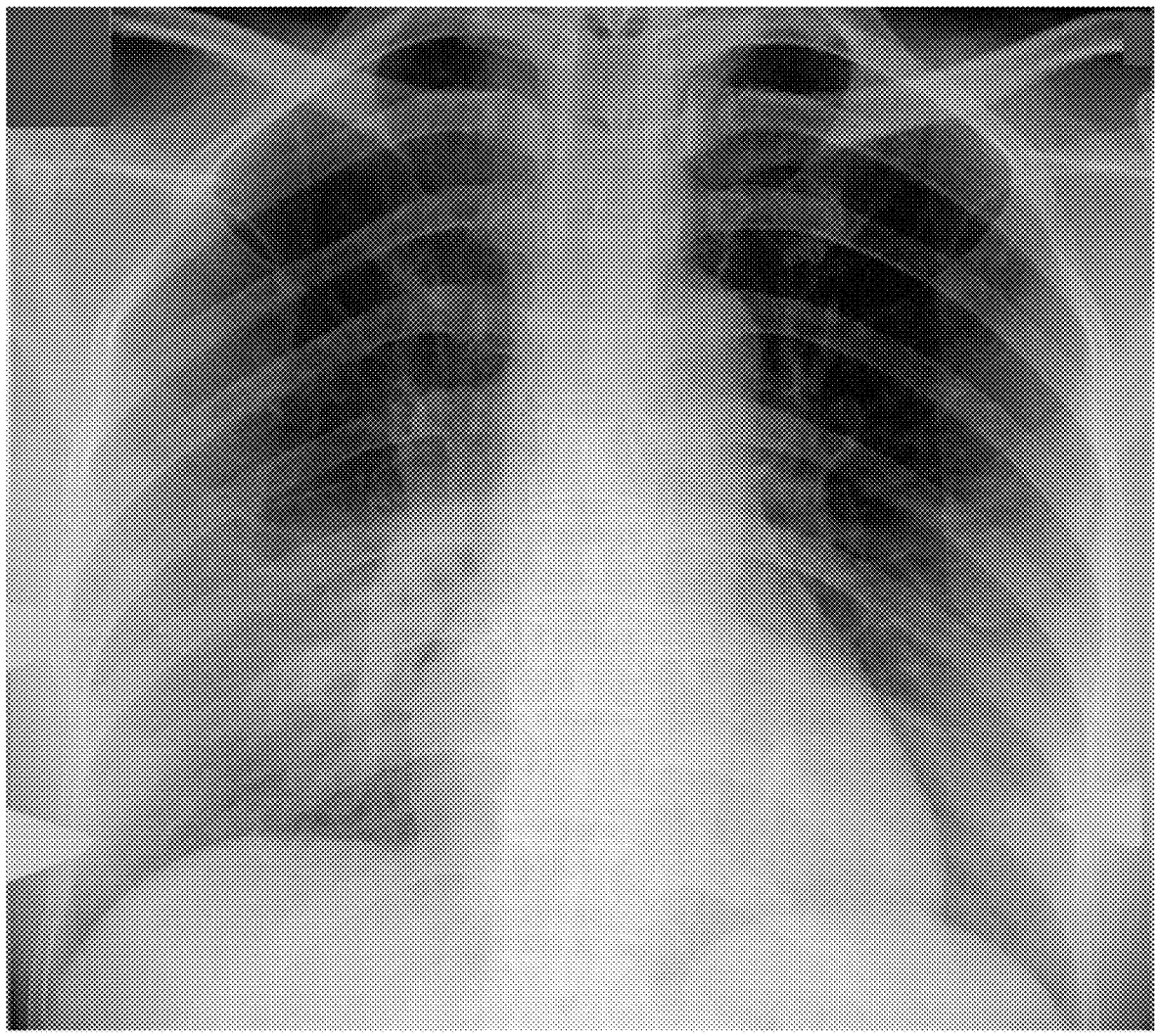
FIG. 2A is an original pulmonary X-ray image

FIG. 1 illustrates an exemplary CAD system for assessment of pulmonary function in patients with Coronaviridae infection and the method for assessing pulmonary function performed thereby. The method 10 broadly includes three sections: (i) preprocessing steps 12 to improve contrast of medical image data, such as an X-ray image, that includes image data of at least one lung and to identify the region of interest in order to enhance diagnostic accuracy of subsequent steps; (ii) modeling steps 14 model the appearance of infected unhealthy chest tissue using a new Markov-Gibbs random field (MGRF) constructed to be invariant under rotation, translation, and change of scale; and determining steps 16 performed by a neural network (NN)-based fusion and diagnostic system to determine whether the severity of lung infection is at a first state, e.g., non-severe or low severity, or a second state, e.g., severe or high severity. In other embodiments, the NN-based fusion and diagnostic system may determine whether the severity of lung infection is one of a plurality of states, e.g., mild, moderate, or severe. The CAD system receives as input for the method 10 medical image data 18, such as a thoracic X-ray image of a subject patient (FIG. 2A), which includes image data of the lung region.

Data Preprocessing

Figure 2B:
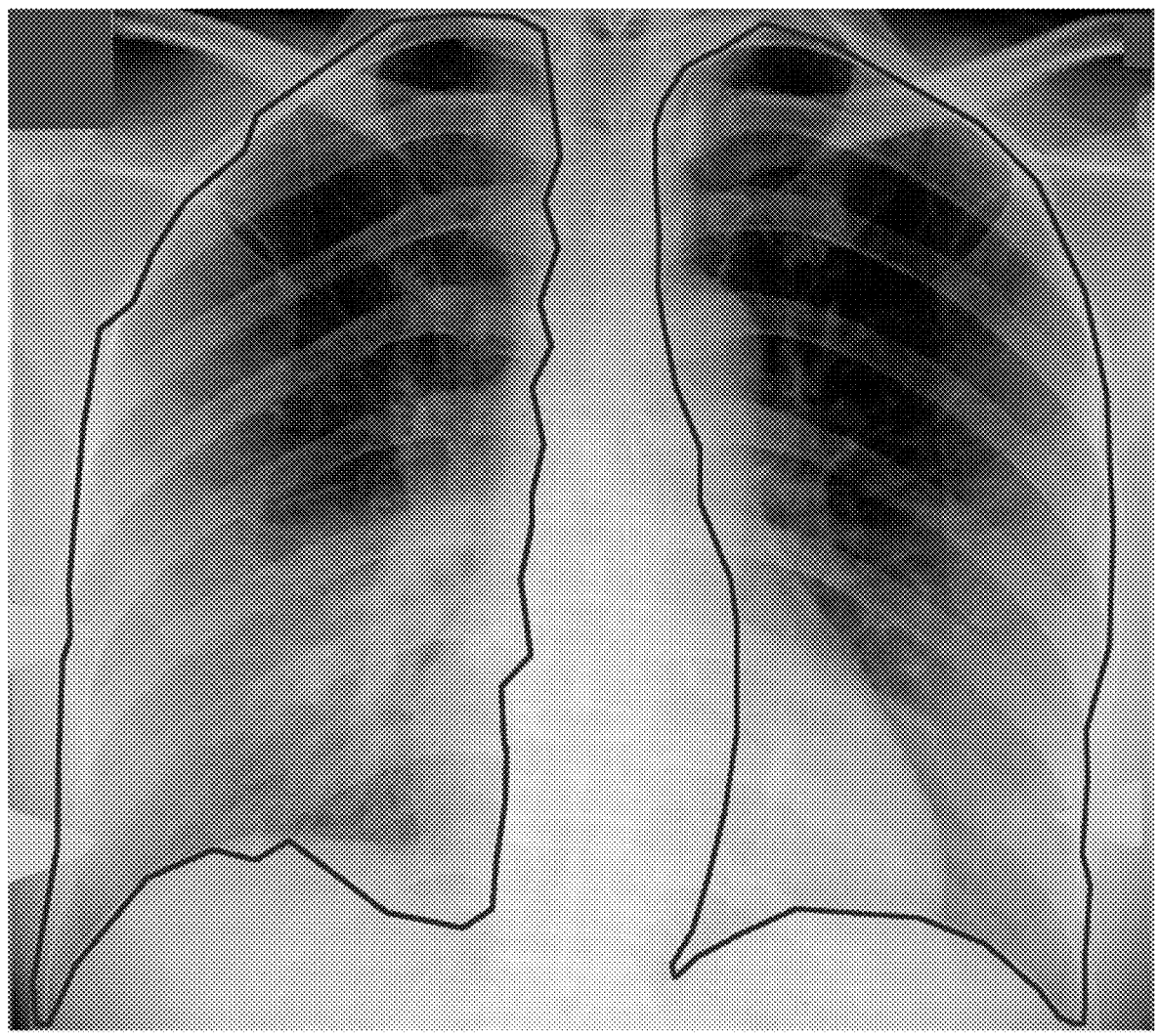
FIG. 2B is the image of FIG. 2A including a roughly segmented lung region.
Figure 2C:
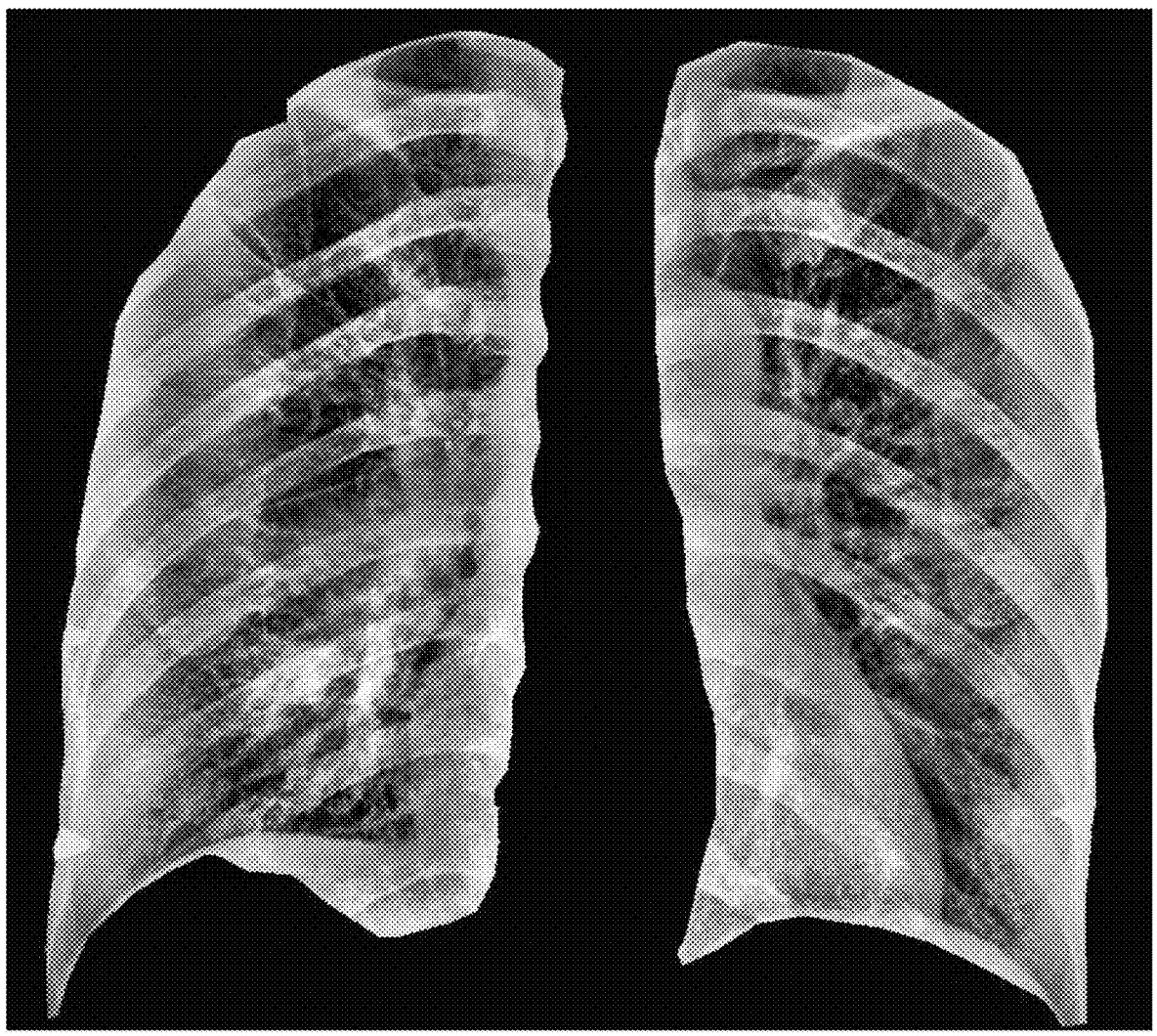
FIG. 2C is the image of FIG. 2B with enhanced contrast of the lung region.

In this exemplary embodiment, the preprocessing steps 12 include three sequential steps to improve the accuracy of the methodology. In the first preprocessing step 20, the medical image data 18 is segmented to identify the lung region (FIG. 2B). This may be performed manually using computer-based methods as described in Soliman, A., Khalifa, F., Elnakib, A., Abou El-Ghar, M., Dunlap, N., Wang, B., Gimel'farb, G., Keynton, R. and El-Baz, A., 2016. Accurate lungs segmentation on CT chest images by adaptive appearance-guided shape modeling. IEEE transactions on medical imaging, 36(1), pp. 263-276, incorporated herein by reference, or other computer-based methods. In the second preprocessing step 22, regional dynamic histogram equalization (RDHE) is utilized to reduce the effect of certain kinds of noise and enhance lung tissue contrast. This approach divides the image into blocks x rows high by y columns wide. Then, dynamic histogram equalization is applied within each block to adaptively enhance the contrast. Therefore, the image histogram is remapped by block, and pixel values are adjusted relative to the other pixels in their x×y neighborhood. The contrast-enhanced X-ray image resulting from the RDHE approach is illustrated in FIG. 2C.

Figure 2D:
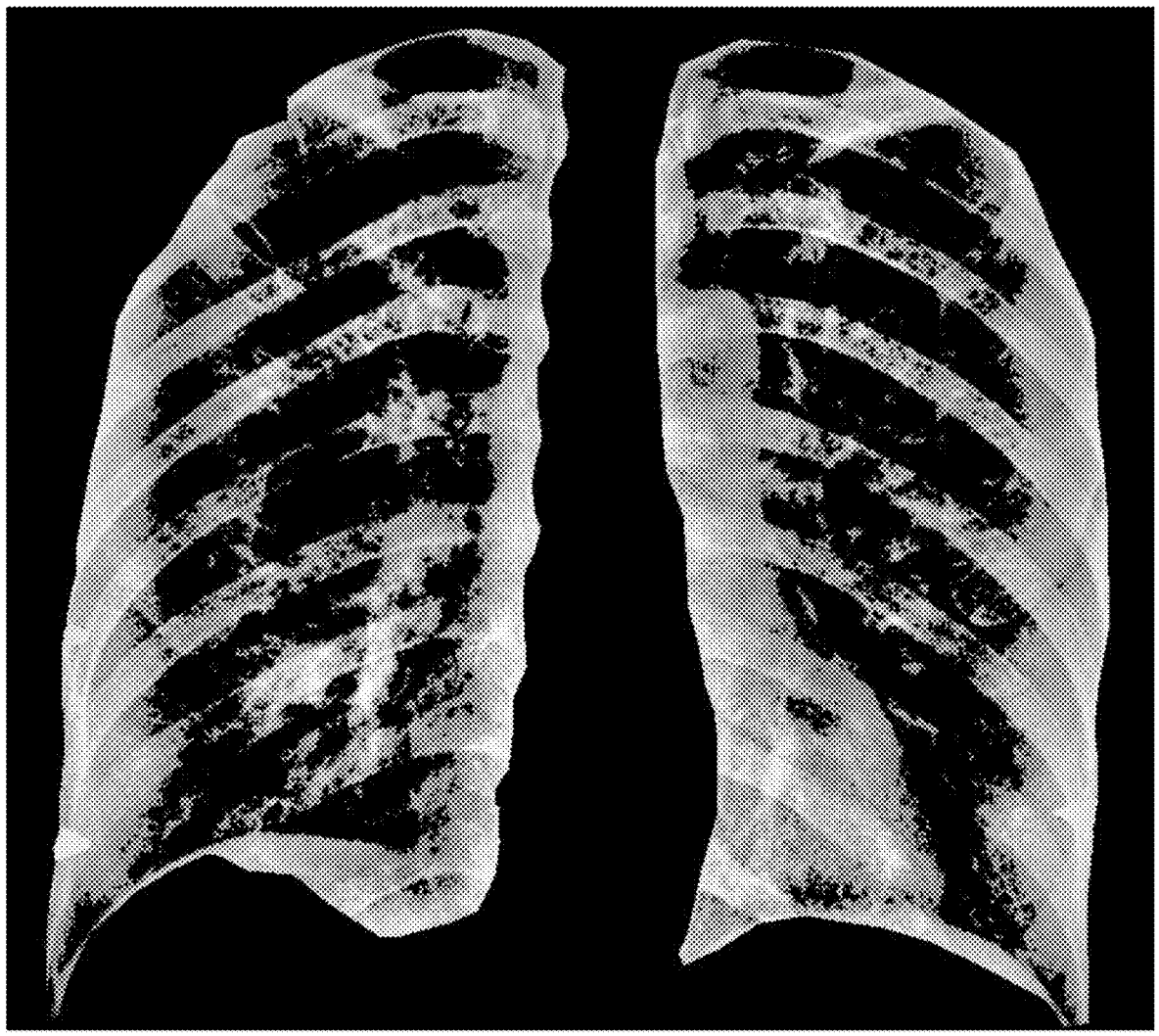
FIG. 2D is the image of FIG. 2C with extracted candidate abnormal tissues.

The third preprocessing step 24 is to identify and mask off the healthy lung tissues from the infected tissues. This step narrows the search space to focus only on the abnormal tissues and serves to increase the diagnostic accuracy of the CAD system. This third step is elaborated in El-Baz, A., Gimel'farb, G. & Suri, J. *Stochastic Modeling for Medical Image Analysis* (Boca Raton: CRC Press, 2016), incorporated herein by reference, and considers both the spatial interaction between nearby image pixels and the intensity distribution of those pixels within the lung region of interest. The instant invention follows the conventional description of the MGRF model in terms of independent signals (images) and interdependent region labels (segmentations) as described in the published article, but focuses on more accurate model identification. Each image segment corresponds to a single dominant mode of the empirical distribution (i.e. histogram) of gray levels. To identify the dominant modes, each image histogram is considered to be sampled from a linear combination of discrete Gaussians (LCDG) distribution. An initial LCDG model is fit to the empirical distribution using a modified expectation-maximization (EM) algorithm. Free parameters of the LCDG to be optimized are the number of discrete Gaussian components and their respective weights (positive and negative), shape, and scale parameters. Then, the initial LCDG-based segmentation is iteratively refined using the MGRF model with its analytically estimated potentials. FIG. 2D displays the extracted pathological tissues using the algorithm disclosed herein.

Rotating, Scale, and Translation Invariant MGRF Model

Figure 3:
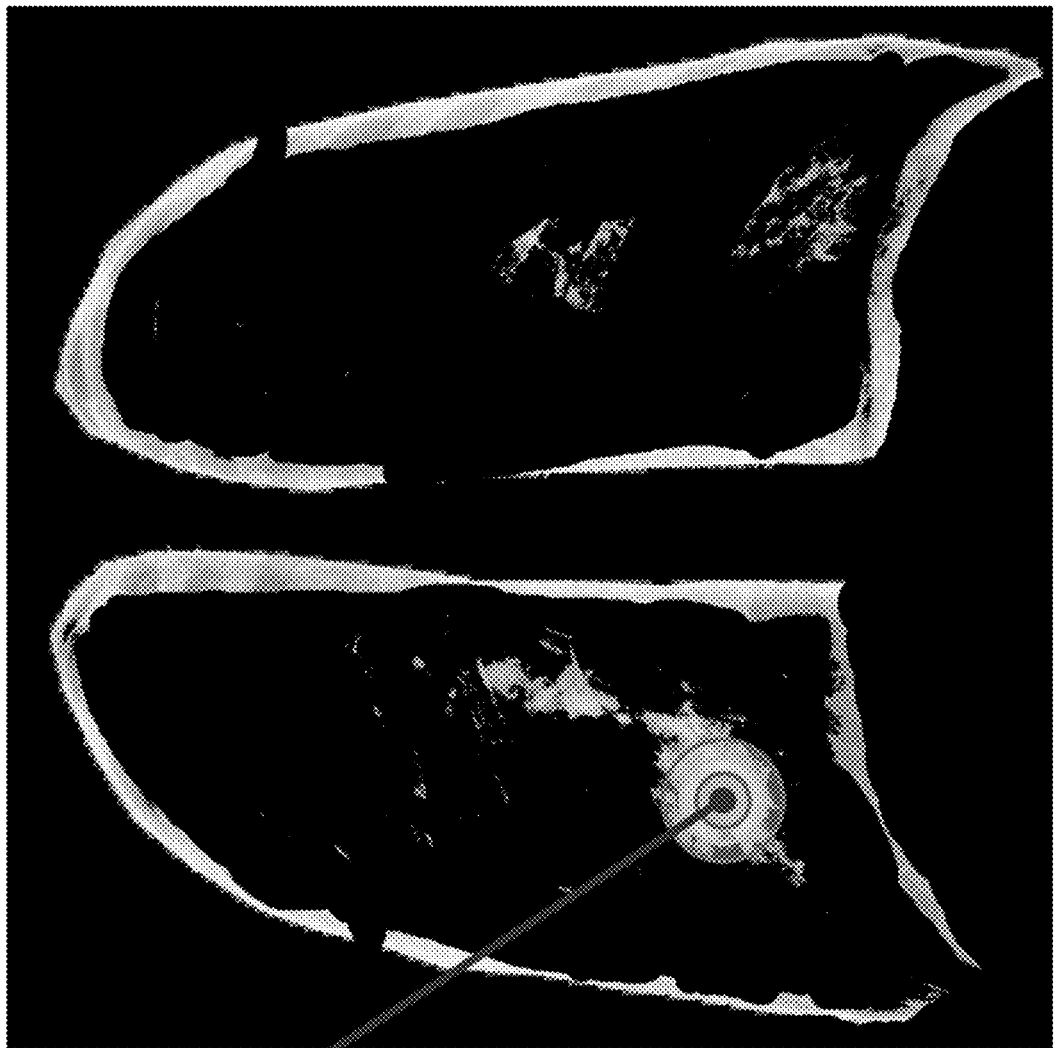
FIG. 3 is an illustration of rotation and translation invariant central-symmetric neighborhood sets for three different radii, $v_1$, $v_2$, and $v_3$ as obtained from chest X-ray image data.
Figure 3:
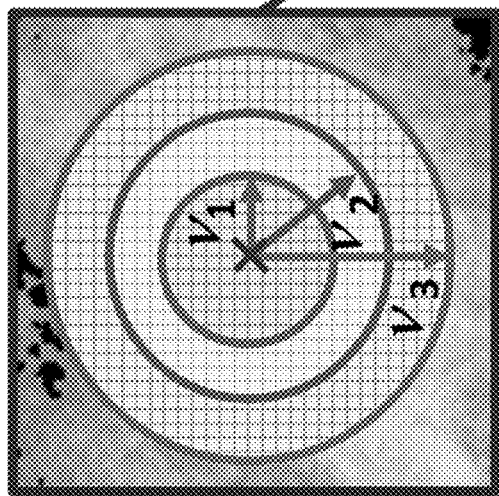
Figure 4A:
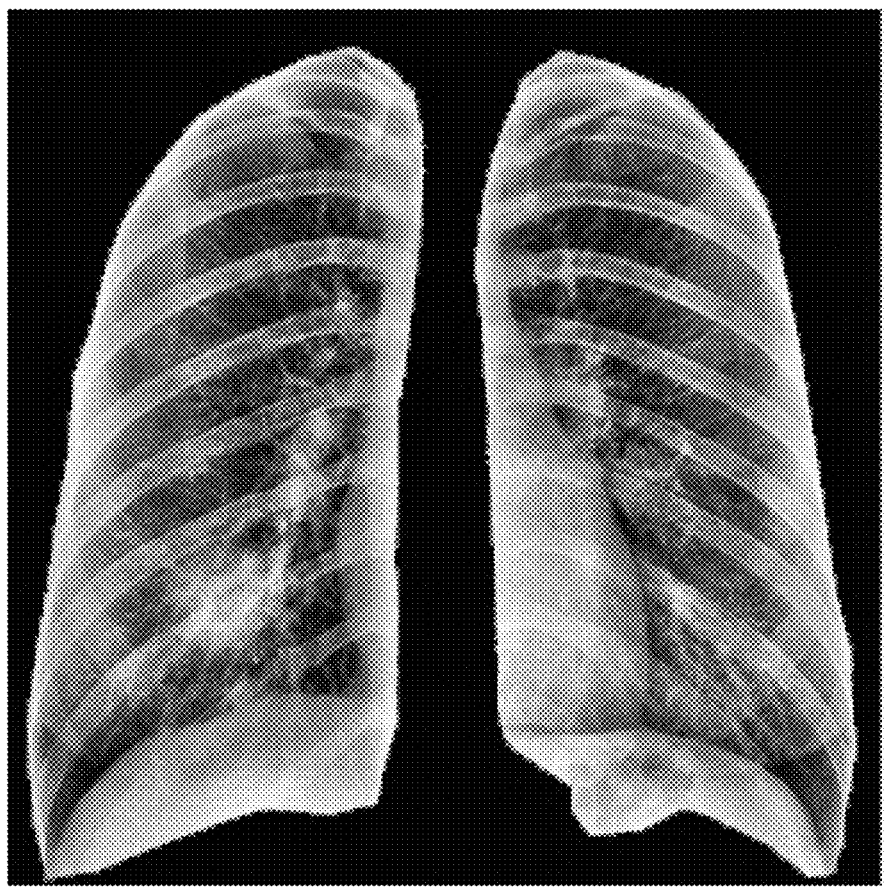
FIG. 4A displays chest X-ray images of a high severity case (upper panel) and a low severity case (lower panel).
Figure 4A:
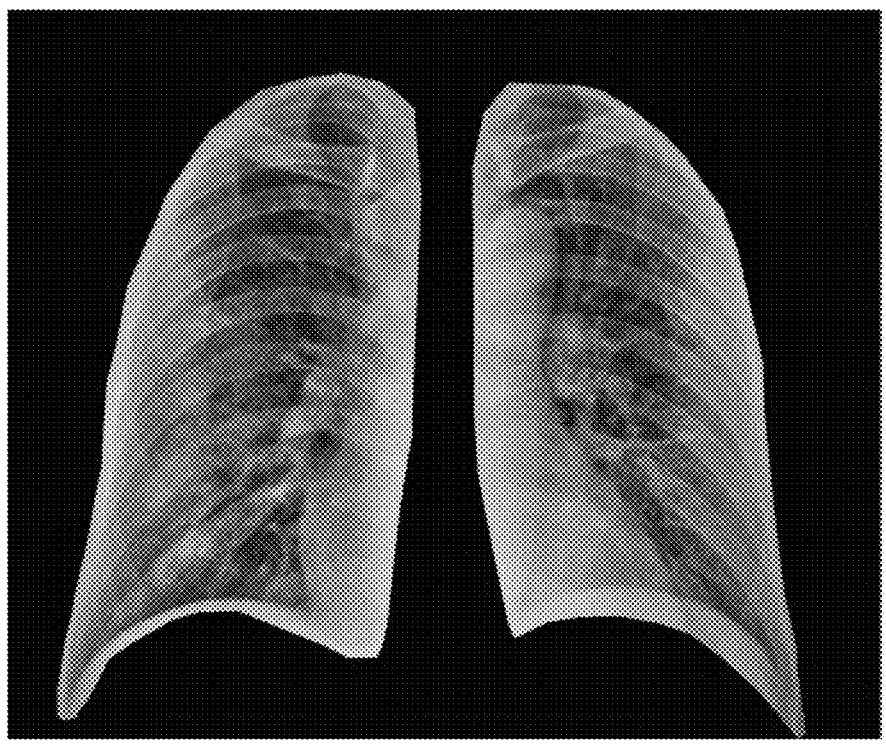
Figure 4B:
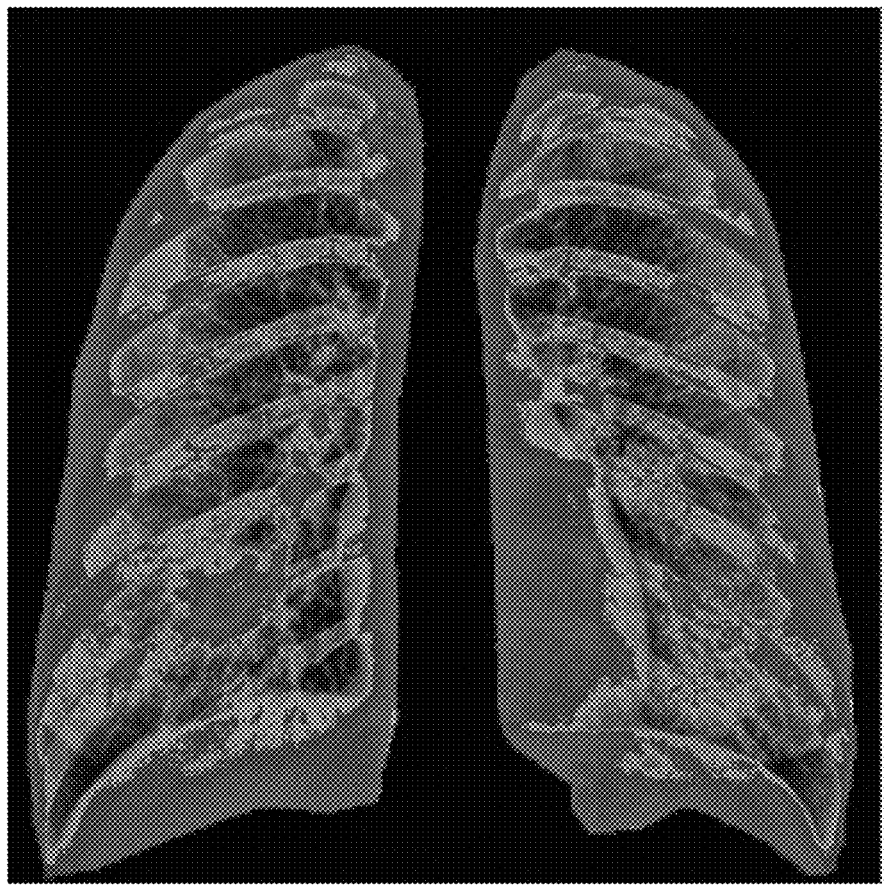
FIG. 4B displays the chest X-rays images of FIG. 4A, with estimated Gibbs energy at $v_1$ indicated by shading.
Figure 4B:
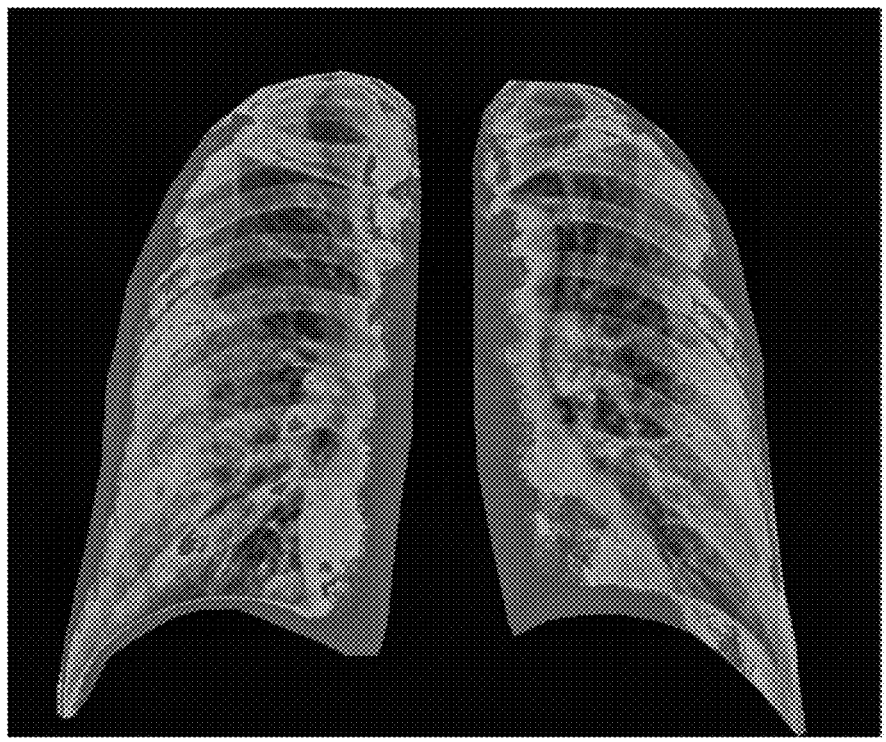
Figure 4C:
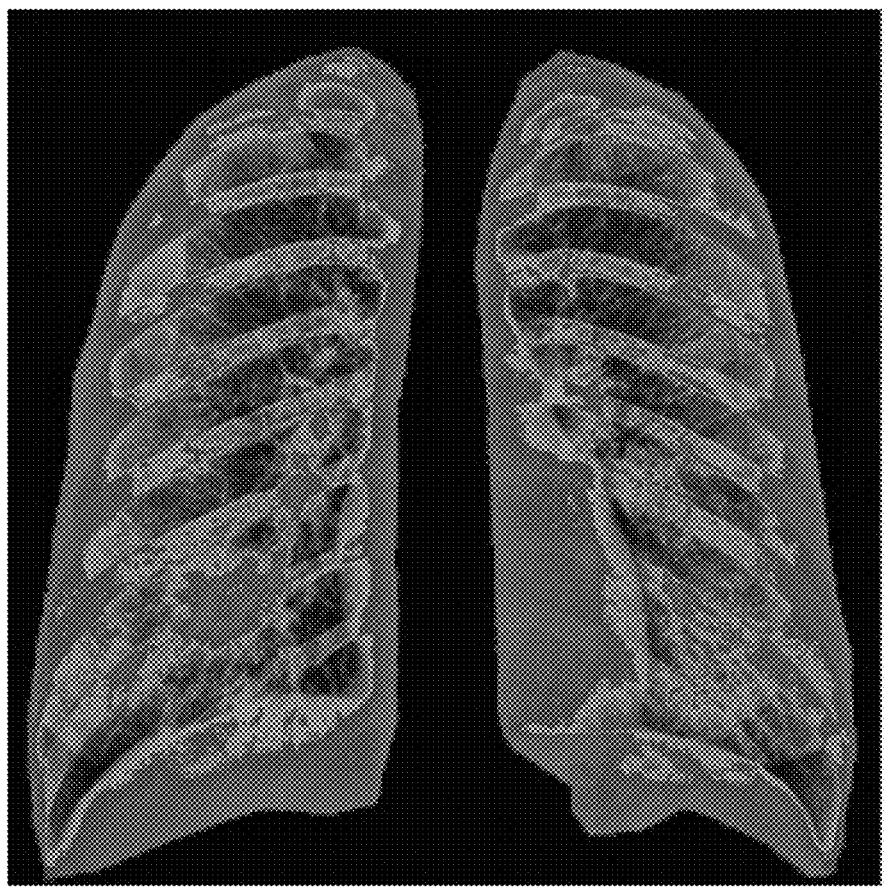
FIG. 4C displays the chest X-rays images of FIG. 4A, with estimated Gibbs energy at $v_2$ indicated by shading.
Figure 4C:
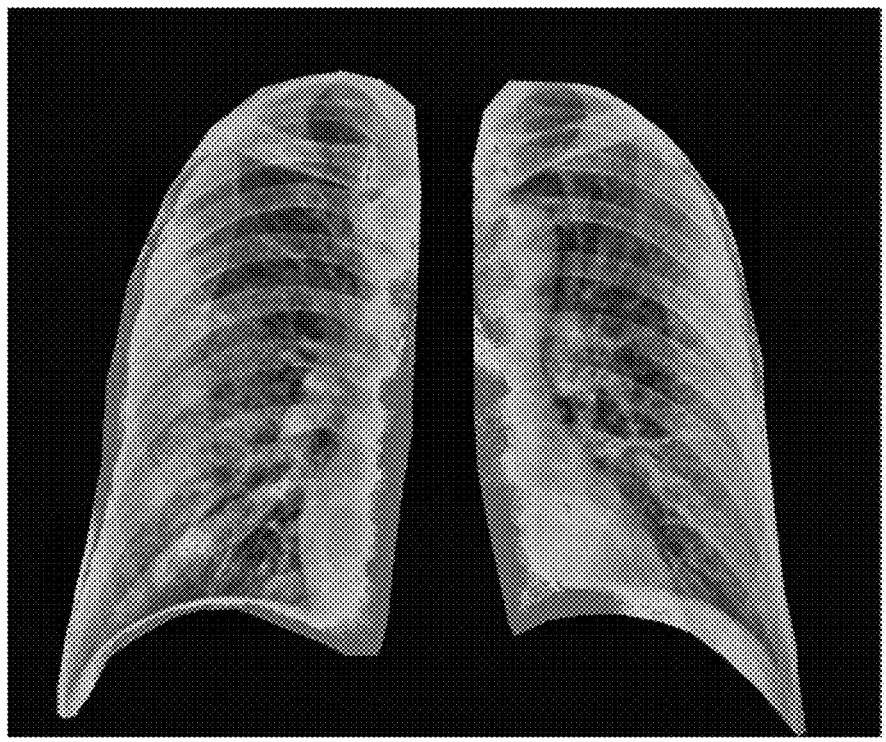
Figure 4D:
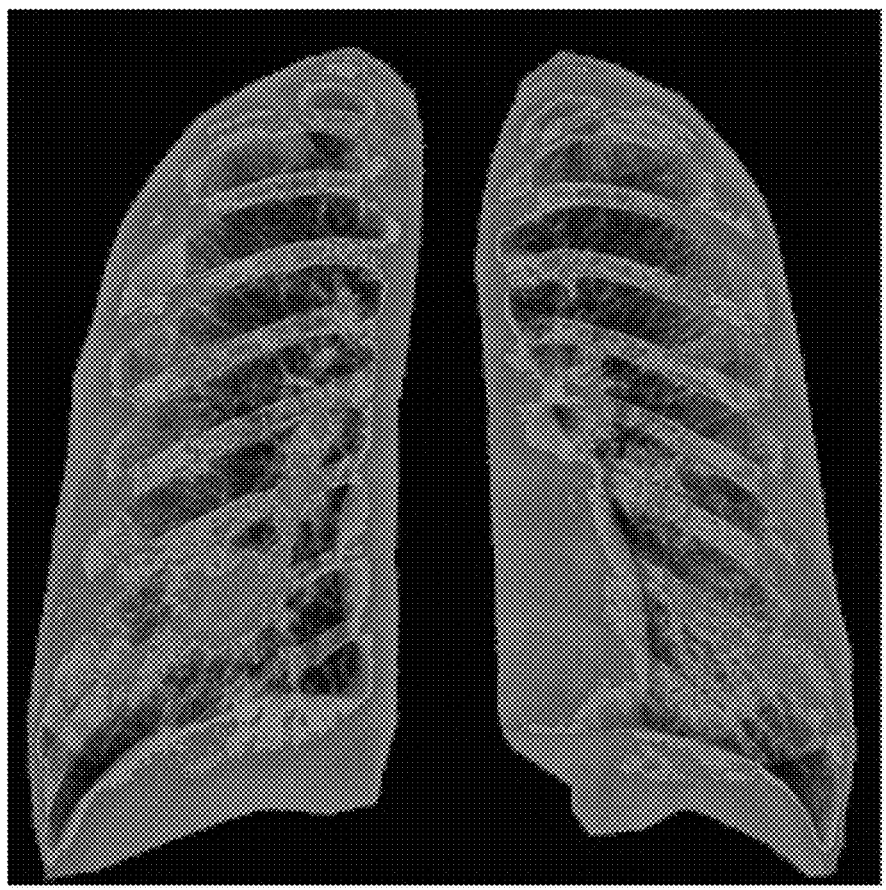
FIG. 4D displays the chest X-rays images of FIG. 4A, with estimated Gibbs energy at $v_3$ indicated by shading.
Figure 4D:
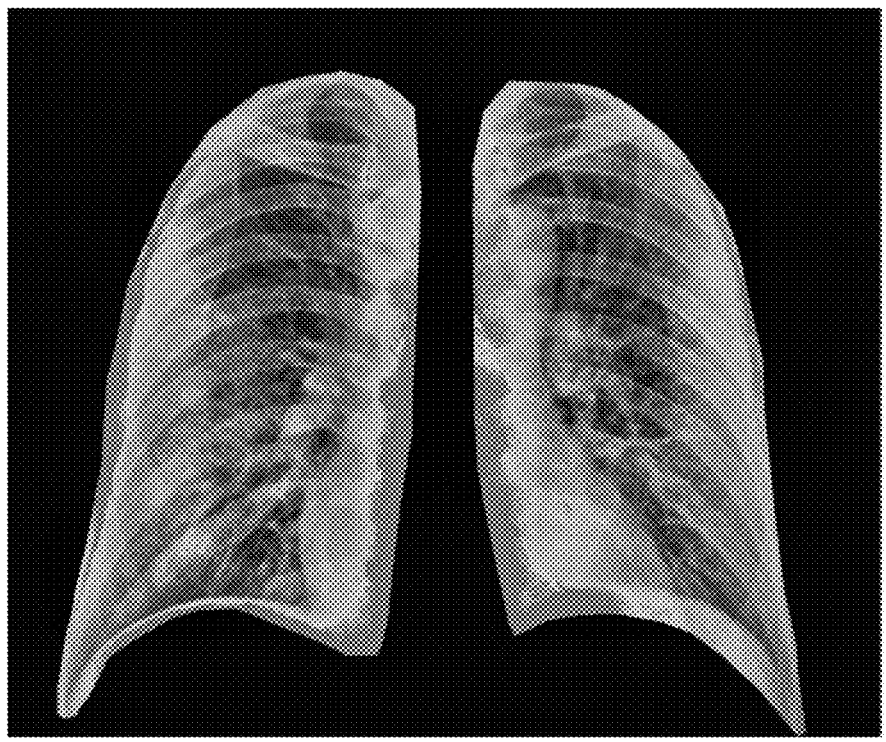

Moving on to the modeling steps 14, the proposed MGRF model was constructed such that that the medical image need not be aligned with any particular frame of reference in order to use it to grade the severity of lung infection as first state, e.g., non-severe or low severity, or second state, e.g., severe or high severity. To construct the appearance of the infected lung regions, the X-ray images are considered as samples from a piecewise stationary MGRF with a central-symmetric system of pixel-pixel interactions. Let $n_v$ denote a set of central-symmetric pixel neighborhoods indexed by $v \in \{1, \ldots, N\}$. Each $n_v$ is a set of coordinate offsets $(\xi, \eta)$ specified by a semi-open interval of interpixel distances $(d_{v,min}, d_{v,max})$ such that the $n_v$-neighborhood of pixel (x,y) comprises all pixels (x',y') such that $d_{v,min} \leq \sqrt{(x-x')^2+(y-y')^2} \leq d_{v,max}$. A neighborhood system corresponding to $d_{v,min}=v-½$ and $d_{v,max}=v+½$, $v \in \{1,2,3\}$, is illustrated in FIG. 3. Associated with the neighborhood system is a set of N+1 Gibbs potential functions of gray value and gray value co-occurrences $V_0:Q \to \mathbb{R}$ and $V_v:Q \times Q \to \mathbb{R}$, $v \in \{1, \ldots, N\}$, where Q is the range of pixel gray levels, e.g. Q={0, . . . , 255} in the case of 8-bit images.

For a given image/label map pair $(g_t, m_t)$ from the training set S, $t \in \{1, \ldots, T\}$, let $R_t=\{(x,y)|m_t(x,y)=ob\}$ denote the subset of the pixel lattice supporting the infected lung region. Denote the set of $n_v$-neighboring pixels restricted to $R_t$ by $$C_{v,t}=\{(x,y,x',y')|(x,y)\in R_t \wedge (x',y')\in R_t \wedge (x-x',y-y')\in n_v\}.$$

Finally, let $f_{o,t}$ and $f_{v,t}$, $v \in \{1, \ldots, N\}$ denote empirical probability distributions (i.e., relative frequency histograms) of gray values and gray value co-occurrences in the training infected region from the X-ray image $g_t$, $$f_{o,t}(q)=|R_t|^{-1}|\{(x,y)\in R_t|g_t(x,y)=q\}|; \quad (1)$$

$$f_{v,t}(q,q')=|C_{v,t}|^{-1}|\{x,y,x',y'\}\in C_{v,t}|g_t(x,y)= q \wedge g_t(x',y')=q'|. \quad (2)$$

The joint probability of object pixels in image $g_t$, according to the MGRF model is given by the Gibbs distribution $$P_t = Z_t^{-1}\exp\left(\sum_{(x,y)\in R_t}\left(v_o(g_t(x,y)) + \sum_{v=1}^{N}\sum_{(\xi,\eta)\in n_v} V_v(g_t(x,y), g_t(x+\xi,y+\eta))\right)\right) = \quad (3)$$

$$Z_t^{-1}\exp\left(|R_t|\left(V_{o,t}^T F_{o,t} + \sum_{v=1}^{N}\rho_{v,t}V_{v,t}^T F_{v,t}\right)\right)$$

where $\rho_{v,t}=|C_{v,t}|/|R_t|$ is an average cardinality of $n_v$ over the sublattice $R_t$.

Assuming lungs having the same pathology exhibit similar morphology in X-ray images, the previous expressions are approximated by their averages over the training set $S: |R_t| \approx R_{ob}$ and $|C_{v,t}| \approx C_{v,ob}$. Here $$R_{ob} = \frac{1}{T}\sum_{t=1}^{T}|R_t| \text{ and } C_{v,ob} = \frac{1}{T}\sum_{t=1}^{T}|C_{v,t}|.$$

Under the assumption that the observations in S are statistically independent (e.g., each X-ray is taken from a different patient), the expression for joint probability of object pixels may be likewise simplified:

$$P_S = \frac{1}{Z}\exp\left(TR_{ob}\left(V_0^T F_0 + \sum_{v=1}^{N}\rho_v V_v^T F_v\right)\right).$$

Here, $\rho_v = C_{v,ob}/R_{ob}$, and the probability vectors $F_{pix,ob}$ and $F_{v,ob}$ are the averages of the relative frequency histograms and normalized gray level co-occurrence matrices, respectively, over all objects in the training set. The problem of zero empirical probabilities, which can arise when a relatively small volume of the training data is available to identify the MGRF model, is dealt with using pseudocounts. Then Equations 1 and 2 are modified as follows:

$$f_{o,t}(q) = \frac{|\{(x,y)\in R_t \mid g_t(x,y)=q\}| + \varepsilon}{|R_t| + Q_\varepsilon} \quad (4)$$

$$f_{v,t}(q,q') = \frac{|\{(x,y,x',y')\in C_{v,t} \mid g_t(x,y)=q \wedge g_t(x',y')=q'\}| + \varepsilon}{|C_{v,t}| + Q^2\varepsilon}. \quad (5)$$

The Bayesian quadratic loss estimate suggests using the offset ε=1, while a more conservative approach suggests using ε=1/Q in Equation 4 and ε=1/Q² in Equation 5.

Using the same analytical approach as in Gimel'farb, G. L. Image Textures and Gibbs Random Fields (Springer Netherlands, 1999), the Gibbs potential functions are approximated using the centered, training-set average, normalized histograms and co-occurrence matrices:

$$V_0(q) = \left(f_0(q) - \frac{1}{Q}\right); \quad (6)$$

$$V_\nu(q, q') = \left(f_\nu(q, q') - \frac{1}{Q^2}\right).$$

Using the above estimated potentials, we can calculate the Gibbs energy of the infected lung region b in an X-ray image g as follows:

$$E(g, b) = V_0^T F_0(g, b) + \sum_{\nu \in N'} V_\nu^T F_\nu(g, b). \quad (7)$$

Here, N' is a selected top-rank index subset of the neighborhoods, and the empirical probability distributions $F_0$ and $F_\nu$ are calculated over the object pixels b of g.

To summarize, the training approach is as follows: (1) read all infected regions from the training data having class "severe" lung infection; (2) calculate the co-occurrence of the image signal at a plurality of different radii (in this embodiment, $v_1$, $v_2$, and $v_3$); (3) normalize the co-occurrence frequency ($f_{pix,ob}(q)$); (4) estimate the Gibbs potential ($V_{pix,ob}(q)$) by using Equation 6 for each radii; (5) use Equation 7 to calculate the Gibbs energy (E(g,b)) for the training subjects. Gibbs energy calculated according to Equation 7 is a statistical estimator, i.e., a function of the observed data. In FIG. 1, boxes 26, 28, and 30 represent the calculated Gibbs energy at $v_1$, $v_2$, and $v_3$, respectively. CDF is used as a new scale-invariant representation of the estimated Gibbs energy, as explained below. In FIG. 1, box 32 represents the CDF for $v_1$, box 34 represents the CDF for $v_2$, and box 36 represents the CDF for $v_3$. Designating neighborhood sets and calculating Gibbs energy for a plurality of different radii allow for capture of both local features (using smaller radii) and global features (using larger radii) of lung lesions in the disclosed CAD system for assessment of pulmonary function for patients with infections, such as Coronaviridae infections, and more specifically, COVID-19.

NN-Based Fusion and Diagnostic System

Classification steps 16 are performed by artificial intelligence. Disclosed herein is an embodiment of a NN system that can fuse the diagnostic results from the three estimated Gibbs energy at three different radii. In other embodiments, two, four, five, or more different radii may be used. The NN system conceptually includes four blocks 38, 40, 42, and 44, each representing a neural network, as illustrated in FIG. 1. Three neural networks 38, 40, 42 are fed with the three different CDFs 32, 34, 36 of the estimated Gibbs energy at each radii as input, then the output of the three neural networks 38, 40, 42 are input into a fourth neural network 44, referred to here as a fusion neural network, and fused to generate a computer aided diagnosis 46 based on the input medical image data. In this exemplary embodiment, the diagnosis 46 may be classification as a first state, e.g., a low severity infection, or a second state, e.g., a high severity infection. In some embodiments, a backpropagation approach is used to train the NN-based diagnostic system as follows: (1) randomly initialize the weights of the proposed NN-network; (2) compute the output of each neuron in the hidden and output layers; (3) update the weights of the proposed NN-network using the batch-mode backpropagation approach; and (4) repeat steps 2 and 3 until there are no significant changes in the NN-network weights.

A hyper-parameters estimation approach is used to tune the hyper-parameters used in the NN system. The parameters to be estimated are the number of bins used to calculate CDF, the number of hidden layers in the NN model, the number of neurons in the hidden layer, and the activation function used to calculate the output of each neuron. Several experiments were run using random values for these parameters to estimate their optimal values using training data. All the results that are demonstrated in the following "Experimental Results" section have been obtained using the following setting: to handle all energy values, the chosen value for the number of CDF bins is 175; the number of hidden layers in the first neural network 38, second neural network 40, and fusion neural network 44 is one, while for the third neural network 42, there are no hidden layers (searching from 0 to 10); the number of neurons per hidden layer is 50, 20, and 2 for the first, second and fusion neural networks 38, 40, 44, respectively (searching from 1 to 200); and the sigmoid activation function has been selected after also considering the tangent and softmax activation functions. A neural network including one hidden layer is the generalized case prior to tuning hyper-parameters. However, in the particular case of tuning the hyper-parameters with respect to training data of COVID-19 positive patients, as described herein, no hidden layer was found to be necessary for the third neural network 42. In other embodiments, each neural network may include zero, one, or more than one hidden layers.

Experimental Results

To test and validate the system, data from a publicly available archive of COVID-19 positive cases, data from COVID-19 Open Research Dataset Challenge (CORD-19), and data from the University of Louisville, USA and Mansoura University, Egypt were used. These databases include 200 subjects tested as COVID-19 positive, 100 from patients who eventually died from the infection and 100 from patients who ultimately recovered. These databases comprise a heterogeneous collection of digital X-ray images, which was used to develop rotation, scale, and translation invariant MGRF model from which the imaging markers are extracted to grade the severity of lung infection in COVID-19 patients.

Figure 5A:
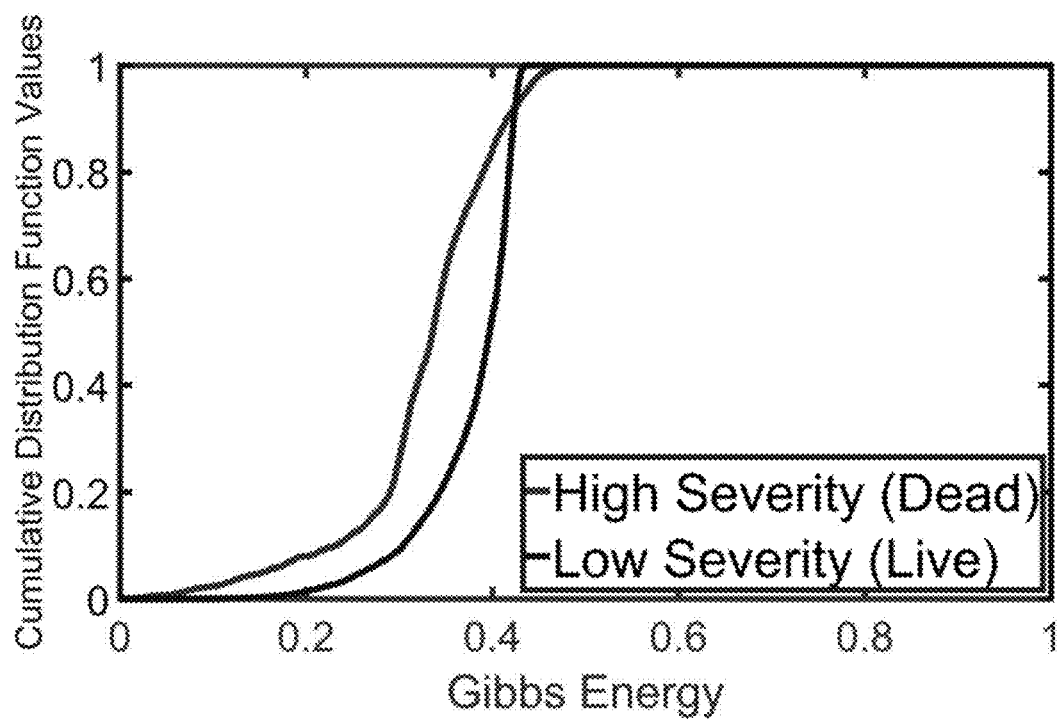
FIG. 5A is a graph comparing cumulative distribution function (CDF) values over Gibbs energy at radius $v_1$ for a subject with a high severity lung infection and a subject with a low severity lung infection.
Figure 5B:
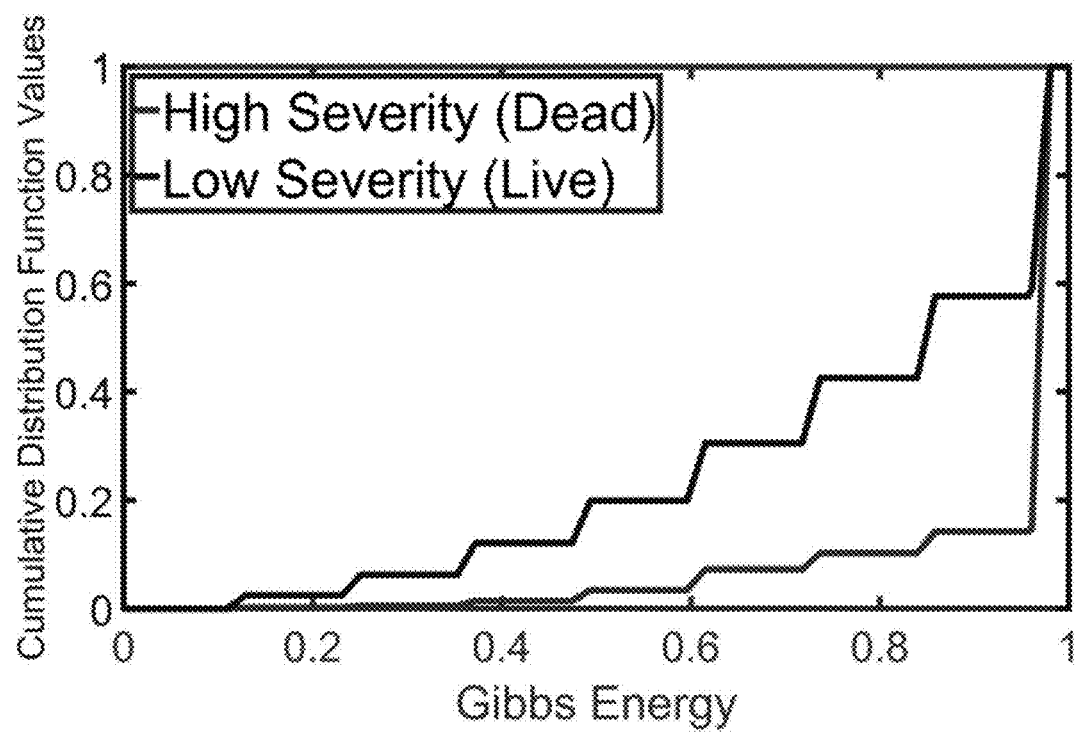
FIG. 5B is a graph comparing CDF values over Gibbs energy at radius $v_2$ for the subject with a high severity lung infection and the subject with a low severity lung infection of FIG. 5A.
Figure 5C:
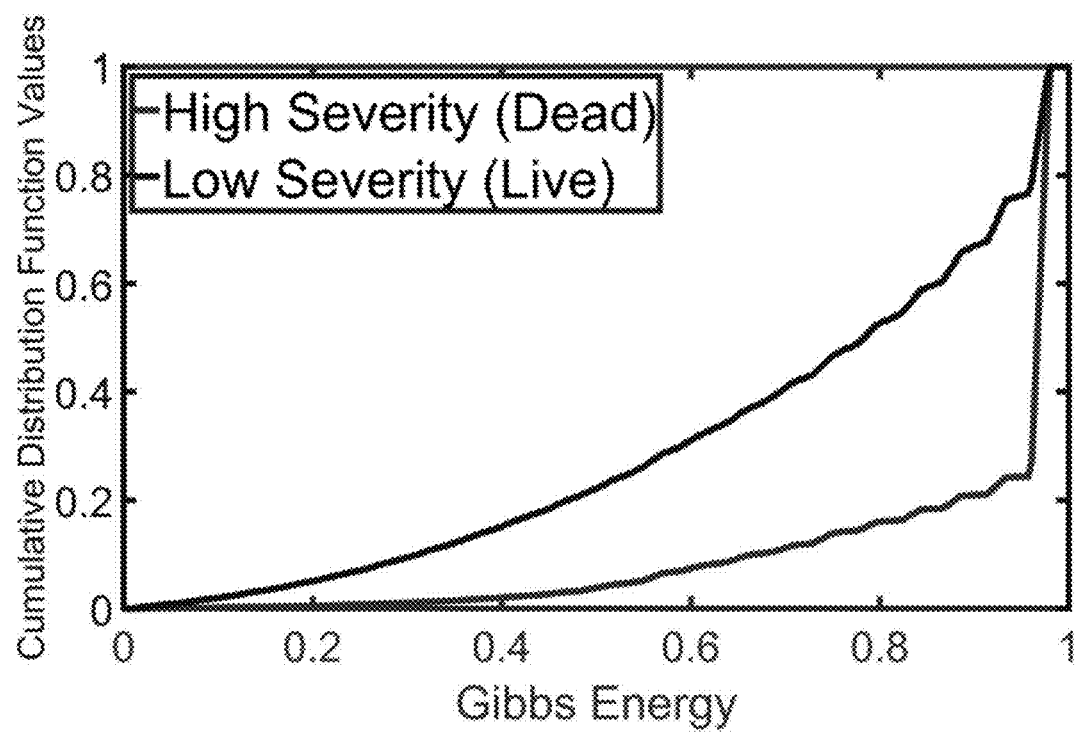
FIG. 5C is a graph comparing CDF values over Gibbs energy at radius $v_3$ for the subject with a high severity lung infection and the subject with a low severity lung infection of FIG. 5A.
Figure 6A:
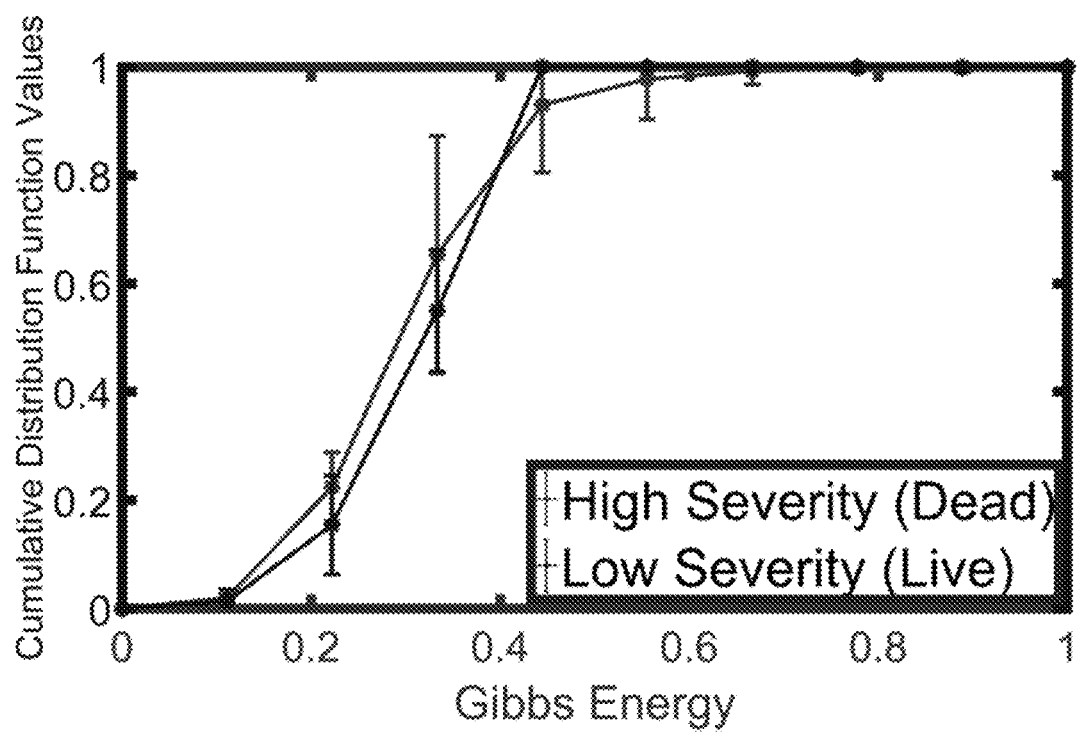
FIG. 6A is a graph comparing CDF values over Gibbs energy at radius $v_1$ for a subject with a high severity lung infection and a subject with a low severity lung infection.
Figure 6B:
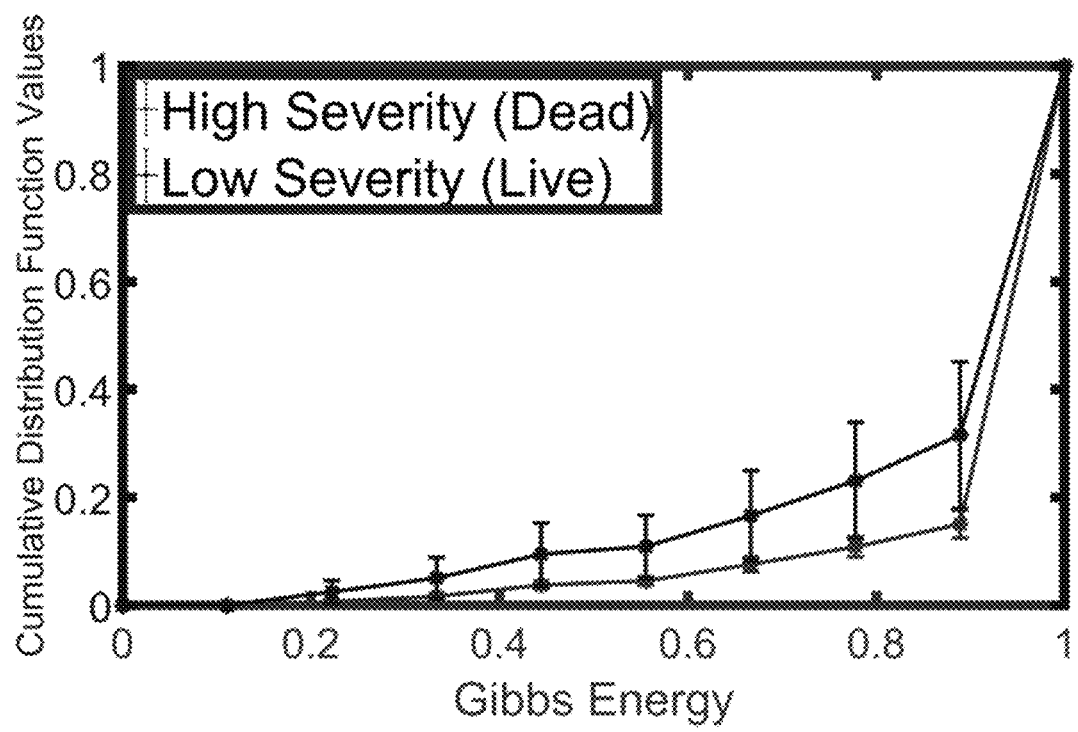
FIG. 6B is a graph comparing CDF values over Gibbs energy at radius $v_2$ for the subject with a high severity lung infection and the subject with a low severity lung infection of FIG. 6A.
Figure 6C:
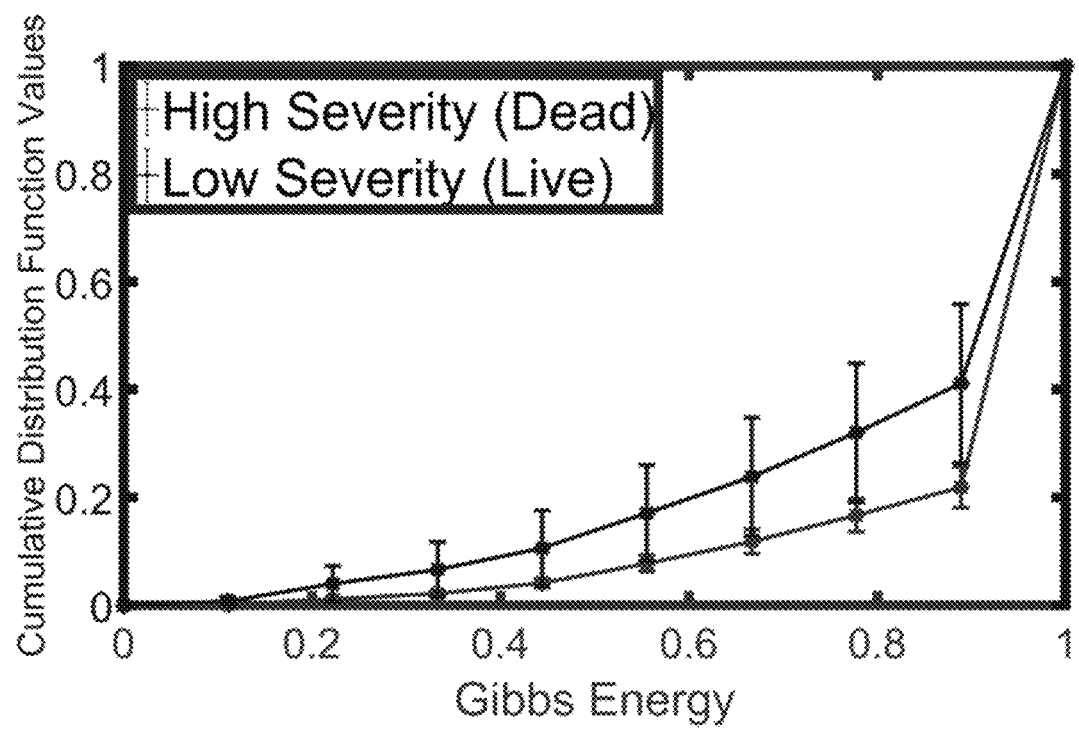
FIG. 6C is a graph comparing CDF values over Gibbs energy at radius $v_3$ for the subject with a high severity lung infection and the subject with a low severity lung infection of FIG. 6A.

Referring now to FIGS. 4A-4D, the figures illustrate the estimated Gibbs energy for high severity lung infections (top panels) and low severity lung infections (bottom panels). Gibbs energy calculated at three radii ($v_1$ in FIG. 4B, $v_2$ in FIG. 4C, and $v_3$ in FIG. 4D) is depicted as a color map fused over the x-ray images. These figures illustrate that the Gibbs energy in cases of high severity of COVID-19 pneumonia is high compared with the Gibbs energy for low-severity COVID-19 pneumonia. Since the collected X-ray images have different resolutions, CDF is used as a new scale-invariant representation to the estimated Gibbs energy which makes it suitable for all data collection protocols as shown in FIGS. 5A-5C. Referring now to FIGS. 6A-6C the average CDFs are calculated with a demonstration of the standard deviation at each point for both classes (high severity vs. low severity) to highlight the advantage of the proposed Gibbs energy as a new discriminatory image marker. The CDFs are rather distinctive which allows for straightforward classification by the proposed NN-based classifier. The output of the CAD system was an assessment of the severity of pneumonia in COVID-19 patients with two possible states: a first state indicating a low severity of infection ("low") or a second state indicating a high severity of infection ("high"). This was compared to the ground truth of the 200 clinical cases collected, 100 of which were from patients who died of COVID-19 and 100 of which recovered. Accurate system outputs include an assessment of "low" in a case that recovered and an output of "high" in a case that died. To confirm the accuracy of the proposed NN classification and fusion system, leave-one-subject-out (LOSO), 10-fold, 4-fold, and a 2-fold cross-validation approaches are performed on our datasets as demonstrated in Table 1. The following objective metrics are used to measure the accuracy of the proposed NN-based fusion system: (i) sensitivity, (ii) specificity, (iii) accuracy, and (iv) Dice similarity coefficient (DSC). As demonstrated in Table 1, the proposed system has achieved 100% accuracy with the LOSO validation test and 98.00%±2.00% for a 2-fold validation test (real-life scenario), all of which confirm the efficacy of the CAD system.

TABLE 1

Diagnostic accuracy of the CAD system

| | Sensitivity | Specificity | DSC | Accuracy |
|---|---|---|---|---|
| Performance of the CAD System | | | | |
| LOSO | 100% ± 0.00 | 100% ± 0.00 | 100% ± 0.00 | 100% ± 0.00 |
| 10-Fold | 100% ± 0.00 | 99% ± 1.00 | 99.50% ± 0.50 | 99.50% ± 0.50 |
| 4-Fold | 100% ± 0.00 | 98% ± 2.00 | 99% ± 1.00 | 99% ± 1.00 |
| 2-Fold | 100% ± 0.00 | 97% ± 3.00 | 98% ± 2.00 | 98% ± 2.00 |
| Performance of the CAD System when using only the Estimated Energy at $v_1$ | | | | |
| LOSO | 76% ± 4.29 | 96% ± 1.97 | 75% ± 4.27 | 86% ± 2.37 |
| 10-Fold | 74% ± 1.26 | 98% ± 4.21 | 83.61% ± 9.15 | 86% ± 7.37 |
| 4-Fold | 71% ± 8.28 | 98% ± 2.31 | 81.87% ± 5.05 | 84.50% ± 3.41 |
| 2-Fold | 71% ± 4.24 | 99% ± 1.41 | 80.87% ± 2.14 | 80.30% ± 1.41 |
| Performance of the Proposed CAD System when using only the Estimated Energy at $v_2$ | | | | |
| LOSO | 81% ± 3.94 | 94% ± 2.39 | 79.33% ± 3.93 | 87.5% ± 2.28 |
| 10-Fold | 79% ± 1.29 | 94% ± 5.07 | 85.45% ± 6.23 | 87% ± 4.83 |
| 4-Fold | 80% ± 8.86 | 93% ± 6.31 | 83.83% ± 6.15 | 86.50% ± 3.41 |
| 2-Fold | 77% ± 1.41 | 91% ± 2.82 | 82.16% ± 2.20 | 85.50% ± 2.12 |
| Performance of the Proposed CAD System when using only the Estimated Energy at $v_3$ | | | | |
| LOSO | 97% ± 1.71 | 94% ± 2.39 | 95% ± 1.85 | 95.5% ± 1.43 |
| 10-Fold | 93% ± 8.23 | 97% ± 4.83 | 94.78% ± 5.56 | 95% ± 5.27 |
| 4-Fold | 92% ± 1.13 | 95% ± 3.83 | 93.16% ± 7.82 | 93.50% ± 7.19 |
| 2-Fold | 91% ± 7.07 | 95% ± 1.41 | 92.79% ± 3.20 | 93% ± 2.82 |

An NN-based classifier was constructed using the estimated Gibbs energy at each radius to highlight the contribution of each Gibbs energy at each radius. As is clear from Table 1, the NN-classifier based on the estimated Gibbs energy at $v_3$ demonstrates the highest accuracy compared with the classification accuracies based on the estimated Gibbs energy at $v_2$ and $v_1$. Also, fusing the three estimated Gibbs energies by using the NN-Based classification system achieves higher accuracy compared with classification accuracies based on each single estimated Gibbs energy. The accuracy of the proposed NN-based fusion system is further compared with support vector machine (SVM), random forest, naive Bayes, K-nearest neighbors (KNN), and decision trees classifiers. The results shown in Table 2, when compared to those shown in Table 1, illustrate that the NN-based classification and fusion system disclosed herein has achieved the highest sensitivity, specificity, DSC, and accuracy compared with other approaches.

TABLE 2

Diagnostic accuracy using different classification systems.

| | Sensitivity | Specificity | DSC | Accuracy |
|---|---|---|---|---|
| SVM-Based CAD System | | | | |
| LOSO | 86% ± 3.48 | 94% ± 2.39 | 84% ± 3.49 | 90% ± 2.01 |
| 10-Fold | 78% ± 9.19 | 97% ± 4.83 | 85.96% ± 6.06 | 87.50% ± 4.86 |

TABLE 2-continued

Diagnostic accuracy using different classification systems.

|  | Sensitivity | Specificity | DSC | Accuracy |
|---|---|---|---|---|
| 4-Fold | 85% ± 1.41 | 92% ± 5.65 | 88.11% ± 1.76 | 88.50% ± 2.20 |
| 2-Fold | 83% ± 3.82 | 91% ± 3.83 | 86.44% ± 1.29 | 87% ± 1.15 |
| Random Forest-Based CAD System | | | | |
| LOSO | 76% ± 4.29 | 96% ± 1.97 | 75% ± 4.27 | 86% ± 2.37 |
| 10-Fold | 74% ± 1.26 | 98% ± 4.21 | 83.61% ± 9.15 | 86% ± 7.37 |
| 4-Fold | 71% ± 8.28 | 98% ± 2.31 | 81.87% ± 5.05 | 84.50% ± 3.41 |
| 2-Fold | 71% ± 4.24 | 99% ± 1.41 | 80.87% ± 2.14 | 80.30% ± 1.41 |
| Naive Bayes-Based CAD System | | | | |
| LOSO | 84% ± 3.68 | 94% ± 2.38 | 82.33% ± 3.68 | 89% ± 2.19 |
| 10-Fold | 80% ± 1.05 | 97% ± 4.83 | 87.13% ± 7.10 | 88.50% ± 5.79 |
| 4-Fold | 77% ± 6.00 | 97% ± 2.00 | 85.46% ± 4.36 | 87% ± 3.46 |
| 2-Fold | 77% ± 4.24 | 95% ± 1.41 | 84.58% ± 2.03 | 86% ± 1.41 |
| KNN-Based CAD System | | | | |
| LOSO | 80% ± 4.02 | 99% ± 1.00 | 79.66% ± 4.01 | 89.50% ± 2.04 |
| 10-Fold | 75% ± 8.87 | 100% ± 0.00 | 85.49% ± 5.88 | 87.50% ± 4.43 |
| 4-Fold | 71% ± 1.10 | 100% ± 0.00 | 82.61% ± 7.43 | 85.50% ± 5.50 |
| 2-Fold | 70% ± 0.00 | 100% ± 0.00 | 82.35% ± 0.00 | 85% ± 0.00 |
| Decision Trees-Based CAD System | | | | |
| LOSO | 80% ± 4.02 | 99% ± 1.00 | 79.66% ± 4.01 | 89.50% ± 2.04 |
| 10-Fold | 75% ± 8.87 | 100% ± 0.00 | 85.49% ± 5.88 | 87.50% ± 4.43 |
| 4-Fold | 71% ± 1.10 | 100% ± 0.00 | 82.61% ± 7.43 | 85.50% ± 5.50 |
| 2-Fold | 70% ± 0.00 | 100% ± 0.00 | 82.35% ± 0.00 | 85% ± 0.00 |

Automation

One or more steps in the method 10 may be implemented in an automated fashion, utilizing a computer or other electronic device to implement such steps. An exemplary apparatus within which various steps from method 10 may be implemented may be a server or multi-user computer that is coupled via a network to one or more client computers, as well as a medical imaging device. Each computer may represent practically any type of computer, computer system, data processing system or other programmable electronic device. Moreover, each computer may be implemented using one or more networked computers, e.g., in a cluster or other distributed computing system. In the alternative, the computer may be implemented within a single computer or other programmable electronic device, e.g., a desktop computer, a laptop computer, a handheld computer, a cell phone, a set top box, etc.

A computer typically includes a central processing unit including at least one microprocessor coupled to a memory, which may represent the random access memory (RAM) devices comprising the main storage of the computer, as well as any supplemental levels of memory, e.g., cache memories, non-volatile or backup memories (e.g., programmable or flash memories), read-only memories, etc. In addition, memory may be considered to include memory storage physically located elsewhere in the computer, e.g., any cache memory in a processor in the CPU, as well as any storage capacity used as a virtual memory, e.g., as stored on a mass storage device or on another computer coupled to this computer. The computer also typically receives a number of inputs and outputs for communicating information externally. For interface with a user or operator, a computer typically includes a user interface incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, the computer may also include one or more mass storage devices, e.g., a floppy or other removable disk drive, a hard disk drive, a direct access storage device (DASD), an optical drive (e.g., a CD drive, a DVD drive, etc.), and/or a tape drive, among others. Furthermore, the computer may include an interface with one or more networks (e.g., a LAN, a WAN, a wireless network, and/or the Internet, among others) to permit the communication of information with other computers and electronic devices. Other hardware environments are contemplated within the context of the invention.

The computer operates under the control of an operating system and executes or otherwise relies upon various computer software applications, components, programs, objects, modules, data structures, etc. Moreover, various applications, components, programs, objects, modules, etc. may also execute on one or more processors in another computer coupled to the computer via a network, e.g., in a distributed or client-server computing environment, whereby the processing required to implement the functions of a computer program may be allocated to multiple computers over a network.

As an example, the computer may include a CAD system program used to implement one or more of the steps described above in connection with method 10. For the purposes of implementing such steps, an image database storing medical image data may be implemented in the computer. It will be appreciated, however, that some steps in method 10 may be performed manually and with or without the use of a computer.

DISCUSSION AND CONCLUSION

ARDS is the most common and severe pulmonary complication in COVID-19 patients. It is an acute hypoxemic respiratory failure that requires oxygen and ventilation therapy including intubation and invasive ventilation. Clinically patients may have dyspnea, tachypnea (respiratory rate ≥30 breaths per minute), decreased peripheral oxygen saturation $S_pO_2$≤93%, poor oxygenation with the ratio of the partial pressure of arterial oxygen to fraction of inspired oxygen $PaO_2/FiO_2$<300 mmHg, or lung infiltrates greater than 50% within 48 h. ARDS occurred in 20% of hospitalized patients and 61% of ICU patients in one study. ARDS occurs when capillaries in the lung leak fluid into the alveoli, thereby impairing gas exchange in the lung and reducing oxygen uptake into the systemic arterial circulation. The consequent decrease in blood oxygen levels can be directly life-threatening, leading to multi-organ failure. Respiratory support of COVID-19 may use invasive or non-invasive methods to force oxygen into the airways under pressure. Invasive ventilation uses an endotracheal tube to feed oxygen directly into the lungs. Non-invasive methods employ such devices as continuous positive airway pressure (CPAP) and oxygen hoods which do not involve use of an internal tube. Non-invasive methods are typically used in the management of less severe cases.

Despite being vital for supporting respiration in patients with ARDS, ventilators are in short supply in hospitals. According to Imperial College London, 30% of patients diagnosed with COVID-19 are strongly recommended to be admitted to the hospitals, with a significant fraction of those patients also requiring respiratory support. As the pandemic spreads across the world, many countries stopped exporting ventilators. The paucity of ventilators is even more acute in under developed and developing countries in South America, Asia, and Africa.

High-pressure ventilation may cause lung injury, also called barotrauma or ventilator-induced lung injury (VILI). Even non-invasive ventilation carries some risk, as stress and strain associated with high tidal volumes may cause patient self-induced lung injury (P-SILI). The additional inflammation due to VILI or P-SILI may lead to aggravation of pulmonary edema and worsening of the very respiratory distress that ventilation was intended to treat. There is also the risk of heart failure, hypervolemia, and multi organ dysfunction, alone or in combination. Unfortunately, COVID-19 patients who are admitted to the ICU and require mechanical ventilation show strikingly high rates of mortality, ranging from 50-97% early in the pandemic. A more recent study showed lower but still dramatic mortality rates of 36% in ICU patients requiring mechanical ventilation and 30% in all COVID-19 patients admitted to the ICU.

Accurate and rapid diagnosis of COVID-19 pneumonia severity is challenging for radiologists as the disease has rapidly spread across the globe. Based on the results demonstrated in this study, AI systems, especially those based on deep learning, are promising tools to assist initial screening by radiologists. It could decrease workload, improve diagnostic accuracy, and enable appropriate treatments and ventilation management of COVID-19 patients. In the case of a pandemic as we now face, medical resources are seriously strained and must be used as efficiently as possible. Rapid diagnosis and accurate prognosis are essential. The AI-based method shows great potential to quantify disease severity and could be used to inform treatment decision-making in patients with COVID-19. AI in concert with thoracic imaging and other clinical information (epidemiology, PCR, clinical symptoms, and laboratory indicators) can effectively improve clinical outcomes. AI can increase the utility of chest X-ray imaging beyond first-line diagnostic imaging and into the areas of risk stratification, monitoring of clinical course, and selection between management approaches, such as invasive vs. non-invasive ventilation, for COVID-19 patients. Multimodal data, be they clinical, epidemiological, or potentially molecular data, can by fused with imaging data in an AI framework to build systems to detect and treat COVID-19 patients and potentially to contain its spread.

The results herein demonstrate the feasibility of using AI with medical imaging data, such as thoracic X-ray imaging data, to determine the severity of lung infection in cases of COVID-19. Severity of pneumonia, as indicated by chest X-ray, correlates highly with mortality and thus this CAD system may be used to predict mortality in COVID-19 patients. While the specification discusses systems and methods using X-ray thoracic X-ray imaging data as input, it should be understood that other 2D and 3D medical imaging data may be used with the neural network-based diagnostic system and methods disclosed herein.

An alternative approach to the use of X-ray images is to use an automatic CAD system to grade COVID-19 from computed tomography (CT) images to determine an accurate diagnosis of lung function. This system segments the lung region from chest CT scans using an unsupervised approach based on an appearance model followed by a 3D rotation invariant Markov-Gibbs random field (MGRF)-based morphological constraints. This system analyzes the segmented lung and generates precise, analytical imaging markers by estimating the MGRF-based analytical potentials. Three Gibbs energy markers are extracted from each CT scan by tuning the MGRF parameters on each lesion separately. The latter are healthy/mild, moderate, and severe lesions. To represent these markers more reliably, a cumulative distribution function (CDF) is generated, then statistical markers are extracted from it. Namely, 10th through 90th CDF percentiles with a 10% increment. Subsequently, the three extracted markers are combined together and fed into a backpropagation neural network to make the diagnosis. The developed system is assessed on 76 COVID-19-infected patients using two metrics, namely, accuracy and Kappa. The proposed system was trained and tested by three approaches. In the first approach, the MGRF model was trained and tested on lungs. This approach achieved 95.83% accuracy and 93.39% kappa. In the second approach, we trained the MGRF model on the lesions and tested it on the lungs. This approach achieved 91.67% accuracy and 86.67% kappa. Finally, we trained and tested the MGRF model on lesions. It achieved 100% accuracy and 100% kappa. The results show the ability of the developed system to accurately grade COVID-19 lesions compared to other machine learning classifiers such as KNN (k-nearest neighbors), decision tree, naïve Bayes and random forest.

Figure 7:
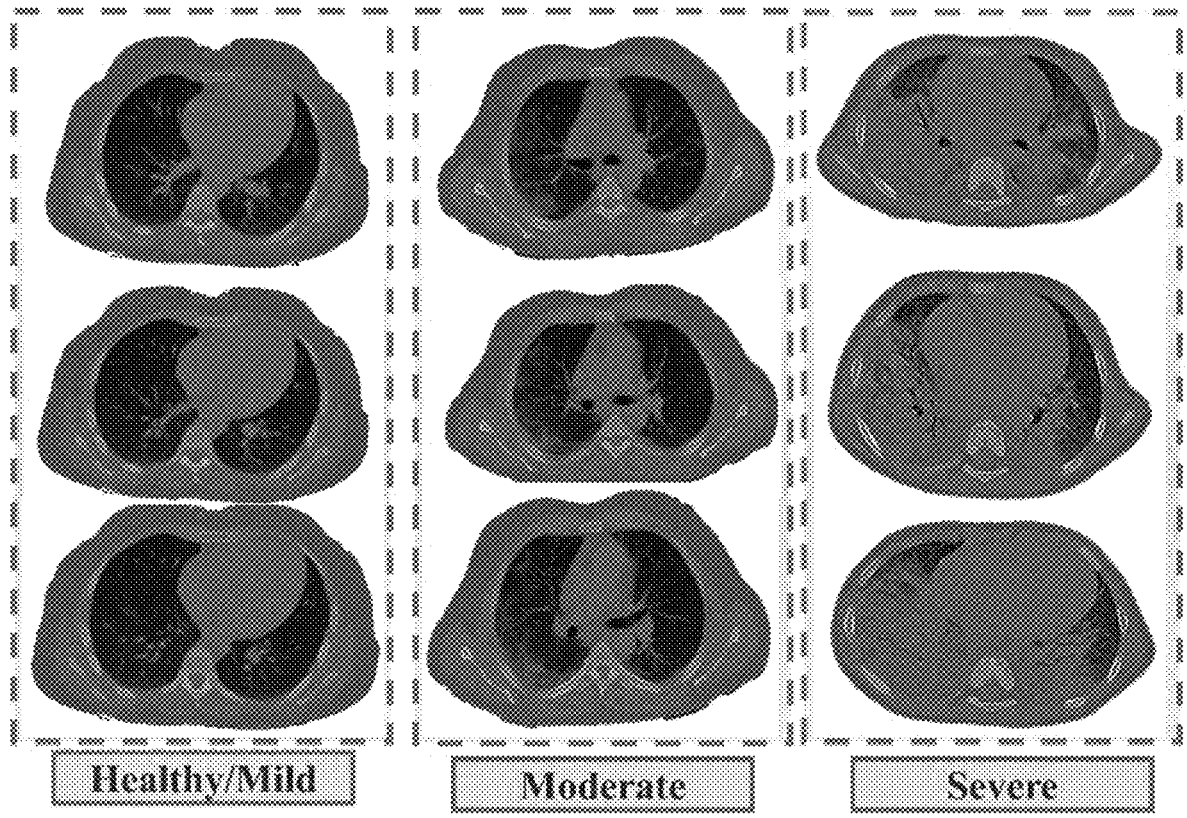
FIG. 7 provides illustrative examples of the three grades of COVID-19.

For the alternative approach to the use of X-ray images is to use an automatic CAD system to grade COVID-19 from computed tomography (CT) images to determine an accurate diagnosis of lung function, early diagnosis and grading of COVID-19 infection is vital to prevent any health complications and thus reduce the mortality rate. Several radiological modalities, such as CT which is the most effective tool to detect lung anomalies, particularly in its early stages, are employed as an assistive tool in diagnosing the severity of COVID-19, ranging from the plain chest or the patchy involvement of one or both lungs in the mild or moderate cases to a pulmonary infiltrate, called white lung, in extreme cases, are shown in FIG. 7. For mild to moderate cases, medical attention or non-invasive ventilation is utilized as a treatment method while mechanical ventilation is adopted in severe cases to help the patients breathe, due to Acute Respiratory Distress Syndrome (ARDS). Although CT has some limitations, such as poor specificity and difficulty differentiating between anomalies and pneumonia during influenza or adenovirus infections, its high sensitivity makes it an excellent tool for determining the disease in patients with confirmed COVID.

Earlier CAD systems employed to classify and grade COVID-19 generally have drawbacks, such as: (1) the existing work used the deep learning techniques, which depends on convolution layers to extract the feature maps, which may not be related to COVID-19 patients; and (2) most CAD systems tended to offer cruder outputs, such as the existence of COVID-19 or not.

Therefore, the present CAD system using CT images to help physicians accurately grade COVID-19 infections, allowing them to prioritize patient needs and initiate appropriate management has been developed. This system will enhance the safety of patients by directing them to the right way and prioritize the usage of medical resources. In some embodiments, this system grades COVID-19 into one of the three categories: healthy/mild, moderate, and severe. First, the lungs are segmented from CT scans based on an unsupervised technique that adapts the first order appearance model in addition to morphological constraints based on a 3D rotation invariant Markov-Gibbs Random Field (MGRF). Then, the tissues of the segmented lungs are modeled using the 3D rotation invariant MGRF model to extract three distinguishable features. These include the Gibbs energy, estimated based on tuning the model parameters for each grade separately. The tuning (or learning) of MGRF model parameters is conducted by adapting a fast analytical estimation originally devised for generic second-order MGRF. The proposed high-order models allow for fast learning of most patterns that are characteristic of the visual appearance of medical images, and are described in more detail in the MGRF-Based Severity Detection Model.

Subsequently, a Cumulative Distribution Function (CDF) is created and sufficient statistical features are extracted. Namely, the 10th through 90th CDF percentiles with 10% increments. Finally, a Neural Network (NN) is employed and fed with the concatenation of these features to make the final diagnosis. In addition, three approaches to tune MGRF parameters were applied. In the first approach, the system was trained and tested on the lung. In the second approach, the system was trained and tested on lesions. In the third approach, the system was trained on lesions and tested on lungs.

Methods

The CAD system includes three major steps: (i) extracting the lung region from 3D CT images; (ii) developing a rotation, translation, and scaling invariant MGRF model to learn the appearance model of the infected lung region for a different level of severity (mild, moderate, and severe); and (iii) developing a Neural Network (NN)-based fusion and diagnostic system to determine whether the grade of lung infection is mild, moderate, or severe.

Lung Segmentation

Figure 8:
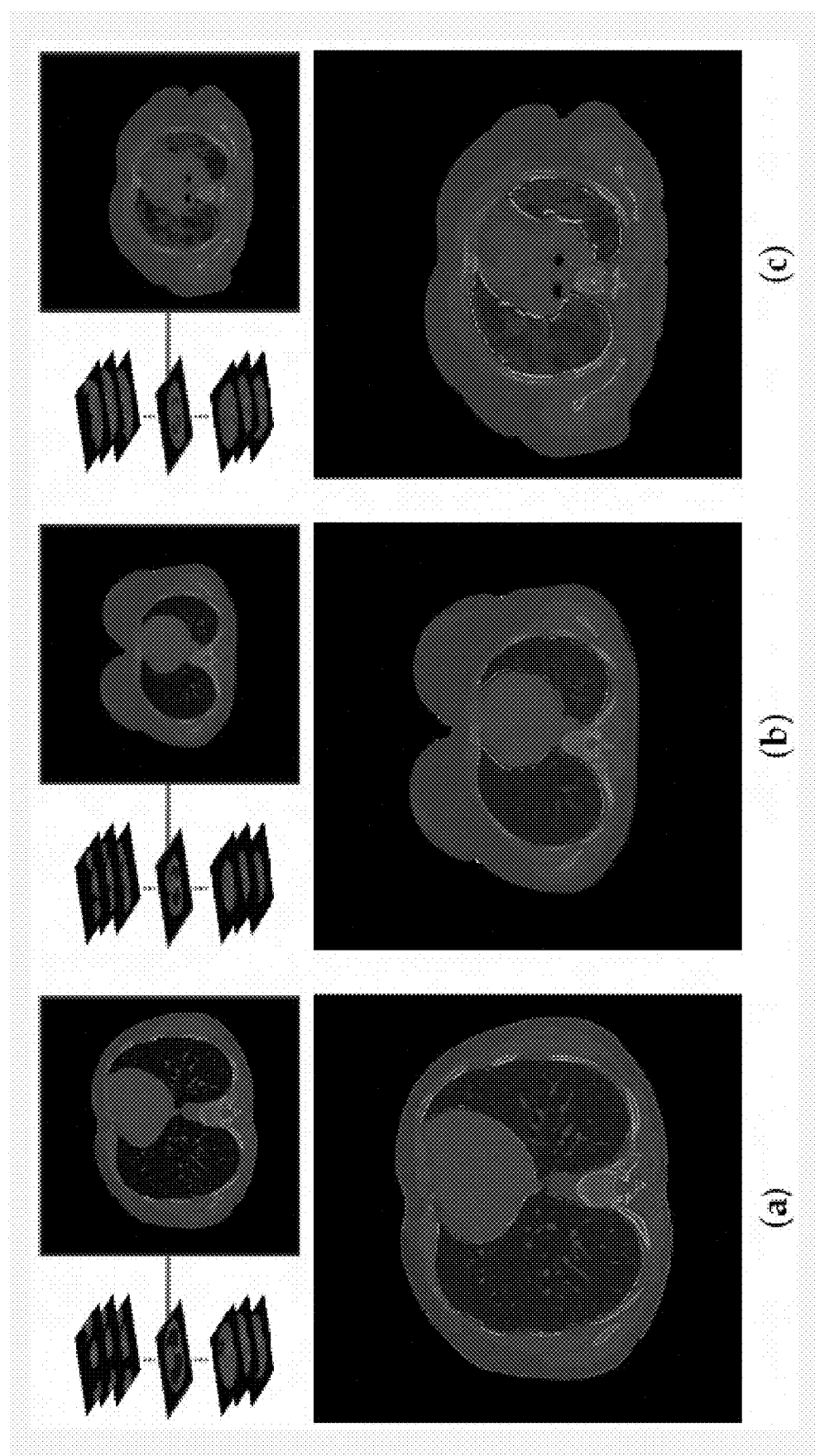
FIG. 8 shows an illustrative framework for the proposed CAD system to detect the severity of COVID-19 through the CT images.

To obtain the most accurate labeling of the effected lung, one must first limit the region of interest to the lungs, properly, excluding non-lung tissue that could otherwise be misidentified as pathological. Thus, the first step in the system is to delineate the boundaries of the three-dimensional lung region in the CT images, as near as possible to how a professional radiologist would perform this task. Some lung tissues, such as arteries, veins, and bronchi, have radiodensity similar to tissues elsewhere in the chest. Therefore, segmentation must consider not only the image gray level, but also the spatial relationship of the CT signal and image segments in 3D, so that the details of the lungs are preserved. To achieve this step, our lung segmentation approach, previously published in *Precise Segmentation of COVID-19 Infected Lung from CT Images Based on Adaptive First-Order Appearance Model with Morphological/Anatomical Constraints*, A. Sharafeldeen, M. Elsharkawy, N. S. Alghamdi, A. Soliman. And A. El-Baz (Sensors 2021, 21, 5482), is used, which incorporates both the radiodensity distribution of lung tissues and the spatial interaction among neighboring voxels within the lung. FIG. 8 demonstrates the segmentation results of this approach for three subjects with different grades of lung infection and the mathematical details of this approach are presented in the cited article. FIG. 8 shows examples of the proposed segmentation approach for (a) left column—healthy/mild, (b) middle column—moderate, and (c) right column—severe COVID-19 infections. Note that the blue/green border represents our segmentation (ground truth).

MGRF-Based Severity Detection Model

In order to capture the inhomogeneity that may be caused by COVID-19 infection, a MGRF model is utilized, which is one of the mathematical models that shows a high ability to capture the inhomogeneity in the virtual appearance model. An instance of an MGRF is specified by an interaction graph, defining which voxels are considered neighbors, and a Gibbs Probability Distribution (GPD) on that graph, which gives the joint probability density of gray levels in a voxel neighborhood. Under a weak condition of strictly positive probabilities of all the samples, the full GPD may be factored into subcomponents corresponding to the cliques, or complete subgraphs, of the interaction graph. Historically, applications of MGRF to image processing have worked to improve their ability to express the richness of the visual appearance by careful specification of the GPD, and to develop powerful algorithms for statistical inference.

We employ a class of MGRF model that is invariant under translation and contrast stretching. It is a generalization of the classical Potts model onto multiple third-order interactions. Learning of model parameters is conducted by adapting a fast analytical framework originally devised for generic second-order MGRF. The proposed higher-order models allow for fast learning of most patterns that are characteristic of the visual appearance of medical images. The proposed nested MGRF models and its learning are introduced as follows.

Let G be the set of grayscale images on a pixel raster R={0, ..., X−1}X {0, ..., Y−1}, i.e., the set of mappings from R to discrete gray values Q={0, ..., Q−1}. For any MGRF model, there is a corresponding probability that g ∈ G is generated by that model, namely the Gibbs probability distribution P(g), where (for the normalized GPD) $\Sigma_{g \in G}$ P(g)=1. In practice P(g) is factored over the maximal cliques of an interaction graph on the pixel raster. The GPD is then completely specified by the set of cliques and their corresponding Gibbs potentials (logarithmic factors).

A translation invariance, K-order interaction structure on R, is a system of clique families, Ca, a=1, ..., A. Each family comprises cliques of one particular shape, and the clique origin nodes include every pixel in R. The corresponding K-variate potential function, $V_a$ (g(r'):r'∈$c_{a:r}$), depends on ternary ordinal relationships between pixels within the clique. The GPD of the translation- and contrast-invariant MGRF then factors as:

$$P(g) = \frac{1}{Z} P_0 \exp\left(-\sum_{a=1}^{A} \sum_{c_{a:r} \in C_a} V_a(g(r'):r' \in c_{a:r})\right).$$

The inner sum $\sum_{c_{a:r} \in C_a} V_a(g(r'):r' \in c_{a:r})$ is called the Gibbs energy and denoted E(g). The partition function $Z = \sum_{g \in G} \exp(-E(g))$ normalizes the GPD over the G. $P_0$ denotes the base probability model. Given a training image $g^o$, the Gibbs potentials for the generic low- and high-order MGRF models are approximated in the same way as for the generic second-order MGRF accounting for signal co-occurrences in:

$$V_a = -\lambda_a(F_a(g^o) - F_{a:ref}). \tag{1}$$

Here, $Fa(g^o)$ is the normalized histogram of gray value tuples over ca for the image $g^o$, while $F_{a:ref}$ denotes the normalized histogram component for the base random field. In principle, the values $F_{a:ref}$ can be computed from the marginal signal probabilities or easily evaluated from generated samples of this base probability distribution. The scaling factor $\lambda_a$ is also computed analytically.

To model lung appearance, a signal co-occurrence-based, multiple pair-wise MGRF model is first employed to learn both the shapes of the cliques and potentials from a set of training lung images. Learning the clique families follows by analyzing the family-wise partial Gibbs energies over a large search pool of potential clique families. The least energetic cliques, which best capture the pixel interactions of the training image set, were selected by unimodal thresholding of the empirical distribution of the family-wise interaction energies. The selection threshold corresponds to the distribution curve to the point at the maximal distance from a straight line from the peak energy to the last non-empty bin of the energy histogram.

Figure 9:
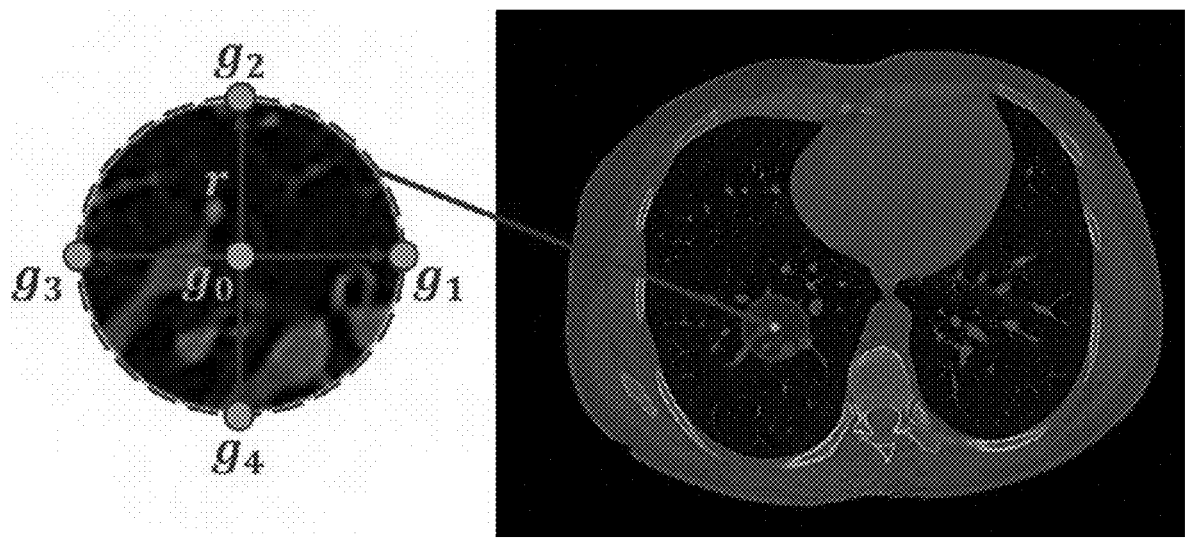
FIG. 9 shows a fourth-order LBP structure, g0 is the central pixel, g1, g2, g3, and g4 are the four neighbours, and r is the radius.

The infected region in the lung tissues is represented by the pixel-wise Gibbs energy of the proposed high-order MGRF. This Gibbs energy is computed by summing the potentials across all characteristic cliques for each pixel in the test subject. The proposed high-order MGRF model is based on using a heuristic fixed neighborhood structure (circular shape) to model the COVID-19 lung lesions. FIG. 9 shows the high-order neighborhood structure with signal configurations:

$\{B(g_0-g_1), B(g_0-g_2), B(g_0-g_3), B(g_0-g_4), N[g_0, g_1, g_2, g_3, g_4]\}$. B denotes the binary ordinal interactions, $$B(g_0-g_1) = 1 \text{ if } |(g_0-g_1)| > 1 \tag{2}$$

N denotes the number of signals greater than T; there are six possible values, from 0 to 5 (to discriminate between the lung/non-lung local binary patterns (LBPs)). In total, $2^4 \ast 6$ signal configurations. The threshold T is learned from the training image.

Algorithm 1 presents the details of the learning LBPs. The energy for each pixel is the sum of potentials over 5 cliques (LBP circular structure) involved with this pixel, and then get the normalized energy.

Algorithm 1: Learning the 4th-order LBPs.
(1) For the training COVID-19 CT image, compute the vector of empirical probabilities (frequencies), $F_r = [f_r(h): h=1, \ldots, 96]$ of the above signal interactions.
(2) Compute the frequency $F_{ref:r} = [f_{ref:r}(h): h=1, \ldots, 96]$ of the same signal interactions from the synthesized image, sampled from the learned second-order MGRF, acting as a base field.
(3) Compute the potentials, $V_r(h) = \lambda_h \ast (f_r(h) - f_{core:r}(h))$, $\lambda_h = 1./(f_{core:r}(h)) \times (1 - f_{core:r}(h)))$. (4) Compute total Gibbs energy of image for candidate radius r=1:1:10, choose r with the largest Gibbs energy.

Feature Representation and Classification System

Figure 10:
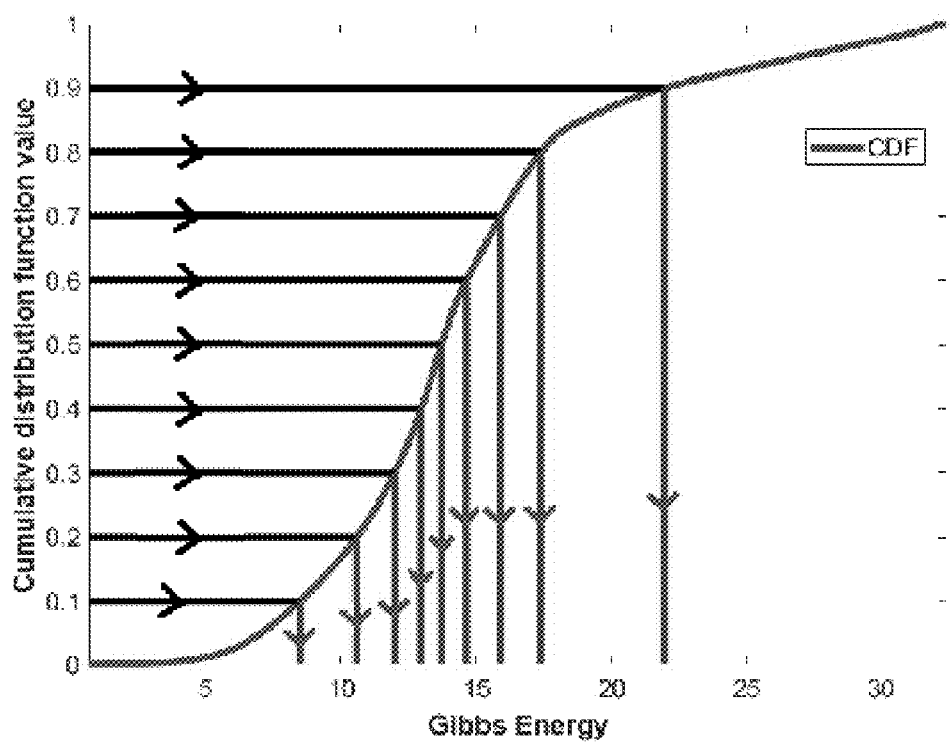
FIG. 10 is an illustrative example of the estimation of CDF percentile feature from CDF.

For a better representation of Gibbs energy, statistical features are employed, namely, the 10th-90th percentiles with 10% increments. These features are extracted by first calculating the CDF, then interpolating the feature values at 0.1-0.9, as presented in FIG. 10.

Then, an NN-based system is built and fed with the concatenation of the CDF percentiles, extracted from the diagnostic findings of the three Gibbs energies, estimated from the three MGRF-based trained models at each grade separately. This network is trained based on the Levenberg-Marquardt optimization algorithm, which considers the fastest backpropagation algorithm. Algorithm 2 presents the basic steps of NN training. This network is tuned by running multiple experiments to select the best NN hyperparameters. These include the number of hidden layers and the number of neurons in each hidden layer. The setup of this network involves three hidden layers with 27, 21, and 11 neurons in each layer, respectively (searching from 2 to 100 neurons).

Algorithm 2: Backpropagation Algorithm.
(1) The value of weights in all layers are initialized randomly.
(2) The values of each neuron in the hidden layer and output layer are calculated.
(3) The weights in a neural network are updated using Levenberg-Marquardt optimization.
(4) Step 2 is repeated until one of the following conditions is achieved:
　(a) Reaching the maximum number of epochs.
　(b) Exceeding the maximum specified time.
　(c) Achieving the target performance.

Experimental Results

Patient Data

We tested our CAD system using COVID-19 positive CT scans collected from Mansoura University, Egypt. This database contains CT images of 76 patients divided into three categories healthy/mild, moderate, and severe. The dataset contains 15 healthy/mild cases, 35 moderate cases, and 26 severe cases.

Evaluation Metrics

We used three evaluation metrics—precision, recall, and F1-score—for each individual class. For each class i, we calculated the true positive ($TP_i$), false positive ($FP_i$), true negative ($TN_i$), and false negative ($FN_i$). Then, we calculated the three evaluation matrices for each class as follows:

$$\text{Precision}_i = \frac{TP_i}{TP_i + FP_i}$$

$$\text{Recall}_i = \frac{TP_i}{TP_i + FN_i}$$

$$F1 - \text{score}_i = \frac{2TP_i}{2TP_i + FP_i + FN_i}$$

Also, we calculated the overall accuracy and Cohen kappa for all classes as follows:

$$\text{Overall} - \text{accuracy} = \frac{\sum_{c=1}^{k} TP_i}{N}$$

$$\text{Kappa} = \frac{P_o - P_e}{1 - P_e}$$

where k is the number of classes, N is the total number of test data, $P_o$ denotes the observed relative agreement between raters, and Pe denotes the theoretical probability of random agreement.

The Performance of the Proposed System

We conducted our proposed system using three different methodologies. The first method (lung model) estimates Gibbs energy by training and testing the model on the patient's lung. The second method (hybrid model) calculates Gibbs energy by training the model on the patient lesion. Then the model is tested on the lung. The third method (lesion model) estimates Gibbs energy by training and testing the model on the lesion. The evaluation of these models is demonstrated in Table 1. As shown in the table, our proposed lesion model performance outperforms the other two models (i.e., lung and hybrid models) with an overall accuracy and a kappa of 100% and 100%, respectively. Thus, the reported results show that the lesion model is the best model for the proposed system. Moreover, to highlight the promise of the proposed NN-based system, different statistical machine learning classifiers were employed in the lung, lesion, and hybrid models separately. For example, a KNN classifier was utilized, which achieved an overall accuracy of 79.17%, 79.17%, and 66.67%, respectively, while the Kappa statistics were 66.1%, 67.48%, and 49.2%, respectively. In addition, SVM classifier achieved overall accuracies of 70.83%, 79.17%, and 70.83%, respectively, while the Kappa statistics were 56.92%, 66.94%, and 55.56%, respectively. A naïve Bayes classifier was also employed, which achieved overall accuracies of 54.17%, 91.67%, and 58.33%, respectively, while the Kappa statistics were 34.32%, 87.1%, and 39.39%, respectively. The decision tree classifier was adapted as well and achieved overall accuracies of 66.67%, 79.17%, and 62.5%, respectively; and Kappa statistics of 48.8%, 66.1%, and 36.84%, respectively. Finally, a random forest classifier was used and achieved overall accuracies of 83.33%, 87.5%, and 75%, respectively; and Kappa statistics of 73.98%, 79.83%, and 58.62%, respectively. From these results, we can conclude that our proposed NN-based system achieves high accuracy when compared to other classifiers.

TABLE 1

Comparison between the proposed system and different machine learning classifiers using lung, hybrid, and lesion models.

| | | | Class Evaluation | | | Overall Evaluation | |
|---|---|---|---|---|---|---|---|
| | Classifier | Class | Recall | Precision | F1-Score | Overall | Kappa |
| Lung Model | Random Forest | Healthy/Mild | 80% | 66.67% | 72.73% | 83.33% | 73.98% |
| | | Moderate | 81.82% | 81.82% | 81.82% | | |
| | | Severe | 87.50% | 100% | 93.33% | | |
| | Decision Trees | Healthy/Mild | 80% | 57.14% | 66.67% | 66.67% | 48.8% |
| | | Moderate | 63.64% | 70% | 66.67% | | |
| | | Severe | 62.50% | 71.43% | 66.67% | | |
| | Naive Bayes | Healthy/Mild | 100% | 41.67% | 58.82% | 54.17% | 34.32% |
| | | Moderate | 9.09% | 50% | 15.38% | | |
| | | Severe | 87.50% | 70% | 77.78% | | |
| | SVM | Healthy/Mild | 100% | 62.50% | 76.92% | 70.83% | 56.92% |
| | | Moderate | 45.45% | 83.33% | 58.82% | | |
| | | Severe | 87.5% | 70% | 77.78% | | |
| | KNN | Healthy/Mild | 60% | 75% | 66.67% | 79.17% | 66.1% |
| | | Moderate | 90.91% | 71.43% | 80% | | |
| | | Severe | 75% | 100% | 85.71% | | |
| | Proposed System | Healthy/Mild | 100% | 100% | 100% | 95.83% | 93.39% |
| | | Moderate | 100% | 91.67% | 95.65% | | |
| | | Severe | 87.50% | 100% | 93.33% | | |
| Hybrid Model | Random Forest | Healthy/Mild | 40% | 66.67% | 50% | 75% | 58.62% |
| | | Moderate | 90.91% | 66.67% | 76.92% | | |
| | | Severe | 75% | 100% | 85.71% | | |
| | Decision Trees | Healthy/Mild | 20% | 50% | 28.57% | 62.50% | 36.84% |
| | | Moderate | 81.82% | 56.25% | 66.67% | | |
| | | Severe | 62.50% | 83.33% | 71.43% | | |
| | Naive Bayes | Healthy/Mild | 80% | 44.44% | 57.14% | 58.33% | 39.39% |
| | | Moderate | 27.27% | 60% | 37.50% | | |
| | | Severe | 87.50% | 70% | 77.78% | | |
| | SVM | Healthy/Mild | 80% | 80% | 80% | 70.83% | 55.56% |
| | | Moderate | 54.55% | 85.71% | 66.67% | | |
| | | Severe | 87.5% | 58.33% | 70% | | |
| | KNN | Healthy/Mild | 60% | 42.86% | 50% | 66.67% | 49.2% |
| | | Moderate | 54.55% | 66.67% | 60% | | |
| | | Severe | 87.5% | 87.5% | 87.50% | | |
| | Proposed System | Healthy/Mild | 100% | 100% | 100% | 91.67% | 86.67% |
| | | Moderate | 100% | 84.62% | 91.67% | | |
| | | Severe | 75% | 100% | 85.71% | | |
| Lesion Model | Random Forest | Healthy/Mild | 100% | 100% | 100% | 87.5% | 79.83% |
| | | Moderate | 100% | 78.57% | 88% | | |
| | | Severe | 62.5% | 100% | 76.92% | | |
| | Decision Trees | Healthy/Mild | 80% | 100% | 88.89% | 79.17% | 66.1% |
| | | Moderate | 90.91% | 71.43% | 80% | | |
| | | Severe | 62.5% | 83.33% | 71.43% | | |
| | Naive Bayes | Healthy/Mild | 100% | 100% | 100% | 91.67% | 87.1% |
| | | Moderate | 81.82% | 100% | 90% | | |
| | | Severe | 100% | 80% | 88.89% | | |

TABLE 1-continued

Comparison between the proposed system and different machine learning classifiers using lung, hybrid, and lesion models.

| Classifier | Class | Class Evaluation | | | Overall Evaluation | |
|---|---|---|---|---|---|---|
| | | Recall | Precision | F1-Score | Overall | Kappa |
| SVM | Healthy/Mild | 80% | 100% | 88.89% | 79.17% | 66.94% |
| | Moderate | 81.82% | 75% | 78.26% | | |
| | Severe | 75% | 75% | 75% | | |
| KNN | Healthy/Mild | 100% | 100% | 100% | 79.17% | 67.48% |
| | Moderate | 72.73% | 80% | 76.19% | | |
| | Severe | 75% | 66.67% | 70.59% | | |
| Proposed System | Healthy/Mild | 100% | 100% | 100% | 100% | 100% |
| | Moderate | 100% | 100% | 100% | | |
| | Severe | 100% | 100% | 100% | | |

Figure 11:
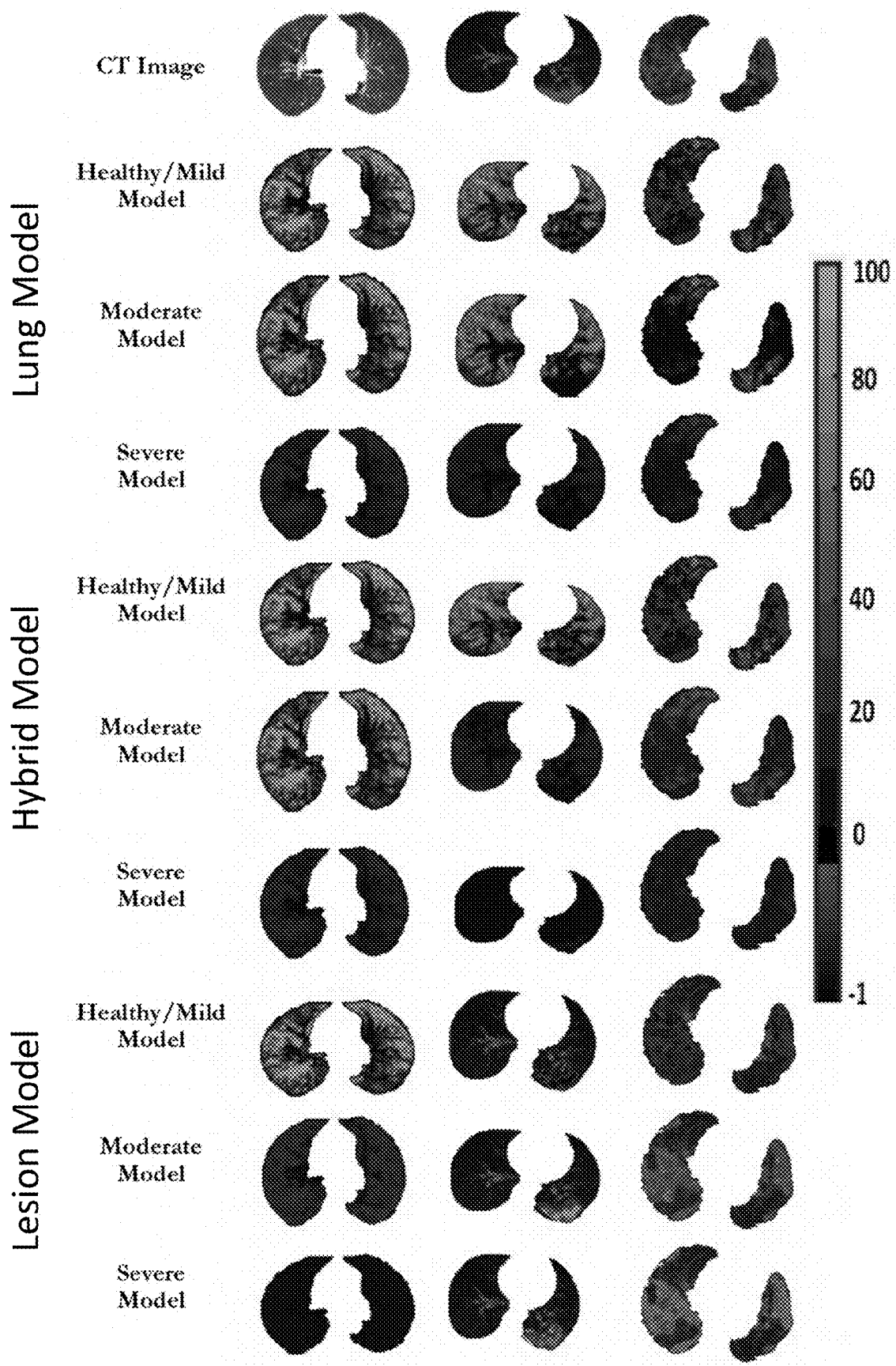
FIG. 11 shows an illustrative colormap example of Gibbs energies for (left column) healthy/mild, (middle column) moderate, and (right column) severe infections; tuned using healthy/mild, moderate, or severe COVID-19 lesions; applied to lung (2nd-4th rows), hybrid (5th-7th rows), and lesion (8th-10th rows) approaches.
Figure 12A:
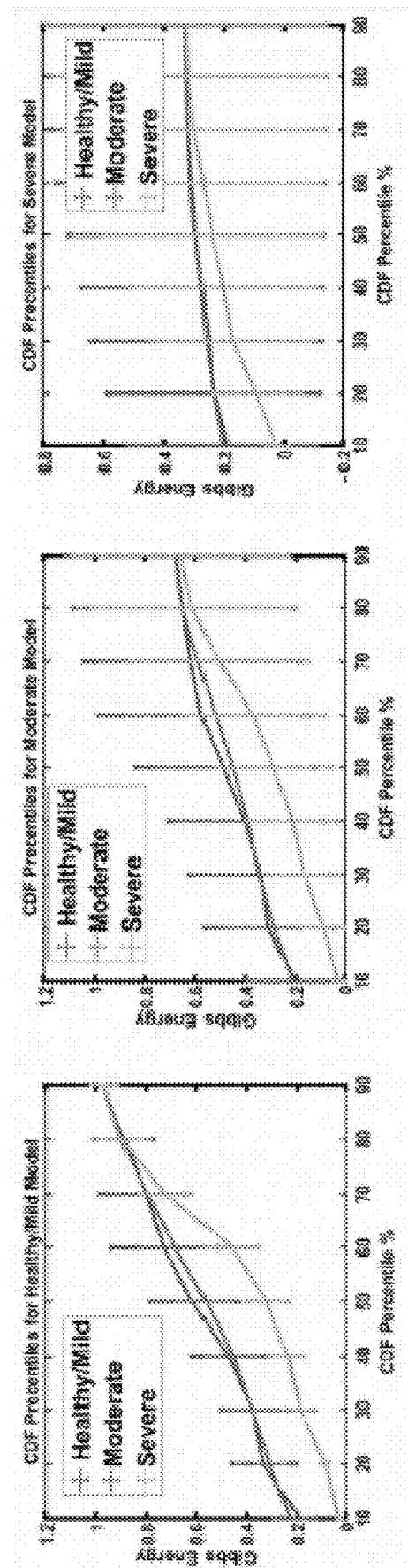
FIG. 12A shows estimated error average of CDF percentiles for three grades when tuning MGRF parameters using (left column) healthy/mild, (center column) moderate, or (right column) severe lesion infection, as applied to the lung model.
Figure 12B:
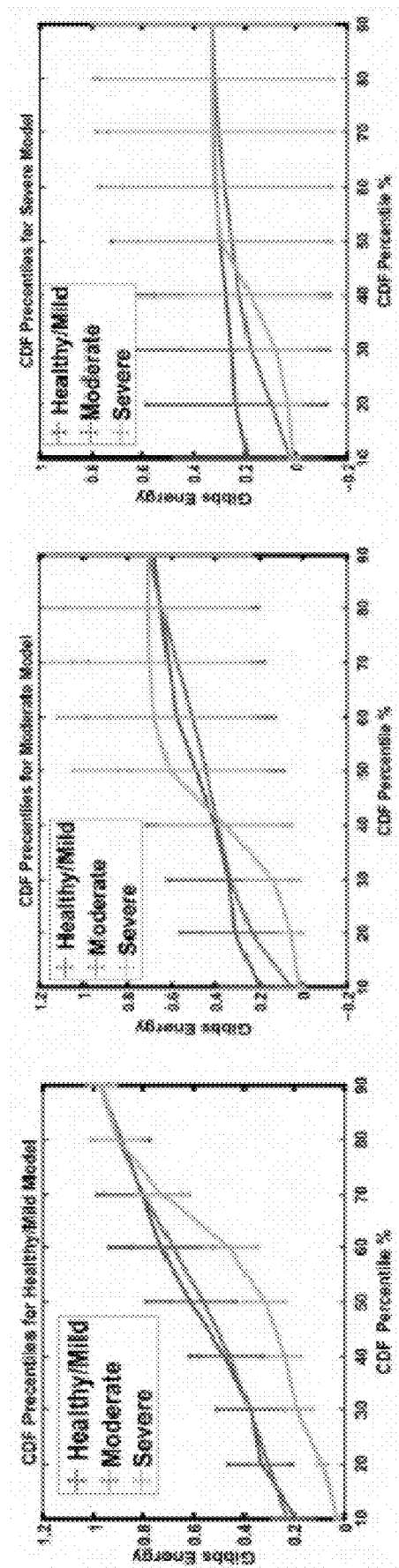
FIG. 12B shows estimated error average of CDF percentiles for three grades when tuning MGRF parameters using (left column) healthy/mild, (center column) moderate, or (right column) severe lesion infection, as applied to the hybrid model.
Figure 12C:
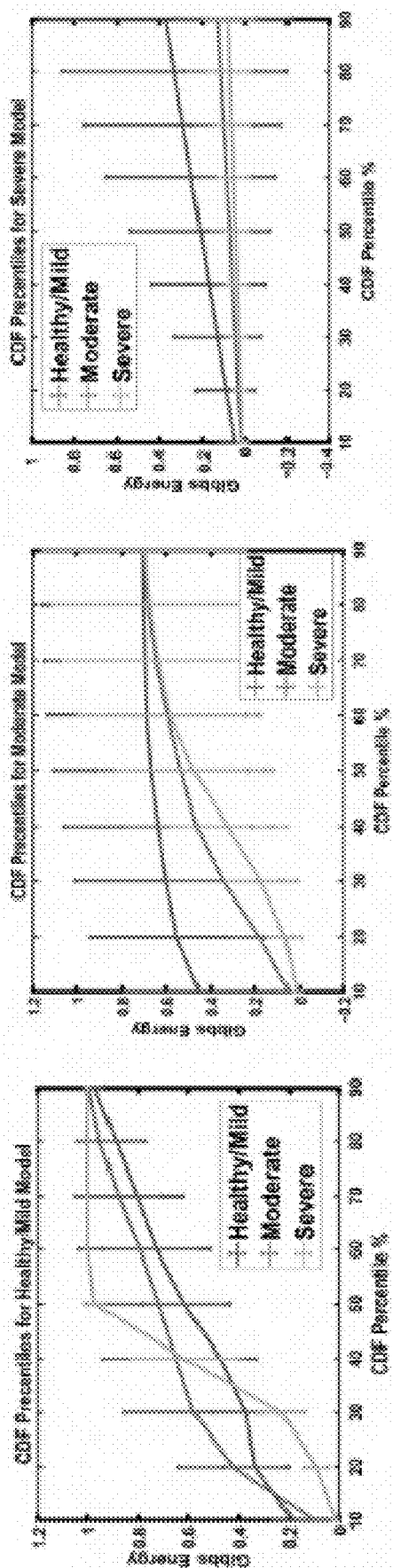
FIG. 12C shows estimated error average of CDF percentiles for three grades when tuning MGRF parameters using (left column) healthy/mild, (center column) moderate, or (right column) severe lesion infection, as applied to the lesion model.

To prove that the results shown in the previous tables are not coincidental, the estimated Gibbs energy is represented by a color map, see FIG. 11. As demonstrated in the figure, Gibbs energy for each grade is higher than the other two grades when the model is tuned using the same grade. For example, Gibbs energy for the healthy/mild case is higher than that of the moderate and severe cases when tuned using healthy/mild cases, and applied to the lesion model. The same goes for moderate and severe MGRF tuning. This shows the reported results in recognition of three grades, especially when applied to the lesion model. Since there are variable resolutions of the CT images in the dataset, we employed CDF percentiles as novel scale-invariant representations of the estimated Gibbs energy, acceptable for all data collection techniques. FIGS. 12A, 12B and 12C show the average error of the CDF percentiles for three grades when tuning MGRF parameters using healthy/mild and moderate and severe lesions, applied to the three models: lung (12A), hybrid (12B), and lesion (12C) models. As shown in the figure, the CDF percentiles of the proposed system, when applied to the lesion model, are more separable than the other two models, demonstrating the efficiency of the lesion model compared to lung and hybrid models. This establishes the attainable accuracy of the proposed lesion model.

DISCUSSION

Patients with severe COVID-19 suffer from significant respiratory compromises and even ARDS. A substantial fraction of COVID-19 inpatients develop ARDS, of whom, 61% to 81% require intensive care. COVID-19 can also induce a systemic hyperinflammatory state, leading to multiorgan dysfunction, such as heart failure and acute renal failure. Consequently, COVID-19 patients admitted to the Intensive Care Unit (ICU) requiring mechanical ventilation have alarmingly high mortality rates. Early in the pandemic, the mortality rate reached 97%. Therefore, it is vital to identify patients with severe COVID-19 lung pathology before they progress to ARDS, respiratory failure, or systemic hyperinflammation, all of which greatly increase the risk of death. Medical resources in health systems across the world have been severely strained. Fast, automated, and accurate assessments of lung CT scans can aid medical care by reducing the burden on medical staff to interpret images, providing rapid interpretations, and making scan interpretations more objective and reliable. In this study, we showed that our system can successfully classify patients into either normal-to-mild, moderate, or severe cases, with accuracies of 92-100% depending on which of our three testing and training approaches is used. Our lesion model produced perfect accuracy in this dataset. This compares very favorably to existing AI systems for analyzing chest imaging in COVID-19 patients. A number of previous studies have also applied AI to chest X-rays or CT scans. These studies achieve accuracies between 90.1% and 95%. Various machine learning techniques were employed, such as convoluted neural networks and deep learning approaches. Some have also used fused imaging data with clinical, demographic, and laboratory data to enhance their systems. While this can improve the accuracy of such systems, most of them suffer from the same drawbacks: 1) the existing work uses deep learning techniques which depend on convolution layers to extract feature maps that may not be related to the pulmonary pathophysiology of COVID-19 patients. 2) Most CAD systems tended to offer cruder outputs, such as the presence of COVID-19 or not. Since its debut, AI has proved to be beneficial in medical applications and has been generally accepted because of its great predictability and precision. Clinical results can be improved by using AI in conjunction with thoracic imaging and other clinical data (PCR, clinical symptoms, and laboratory indicators). During the COVID-19 diagnostic stage, AI may be utilized to identify lung inflammation in CT medical imaging. AI also can be used to segment regions of interest from CT images. Therefore self-learned features can be easily retrieved for diagnosis or for any other use. Through the fusion of imaging data inside an AI framework, multimodal data, whether clinical or epidemiological data, may be constructed to detect and treat COVID-19 patients, in addition to potentially stopping this pandemic from spreading.

In conclusion, our results demonstrate that AI can be used to grade the severity level of COVID-19 by analyzing the chest CT images of COVID patients. As we have shown, the high mortality rate is related to pneumonia severity on chest CT images. Therefore, our CAD system will be utilized to detect the severity of COVID-19. Then, the patient will be directed to the correct treatment. This will lead to a reduction in the mortality rate of COVID-19. In the future, we plan to collect more data and validate our developed system on separate data, as well as include demographic markers in our analysis.

Various aspects of different embodiments of the present disclosure are expressed in paragraphs X1, X2, X3, X4 and X5 as follows:

X1. An embodiment of the present disclosure includes a method for assessing pulmonary function, comprising: receiving medical image data that includes image data of at least one lung; segmenting image data of the at least one lung from other image data; modeling the segmented image data using a model with a central-symmetric system of pixel-pixel interactions; and classifying, using a neural network, pulmonary function as a first state or a second state based at least in part on the model.

X2. An further embodiment of the present disclosure includes a process for assessing pulmonary function, comprising: receiving medical image data that includes image data of at least one lung; segmenting image data of the at least one lung from other image data; modeling the segmented image data using a model with a central-symmetric system of pixel-pixel interactions; and classifying, using a neural network, pulmonary function as a first state or a second state based at least in part on the model.

X3. A further embodiment of the present disclosure includes a computer aided diagnostic system, comprising: at least one data processor; at least one memory; and program code stored on the at least one memory, the program code configured to be executed by the at least one processor to cause the at least one processor to: receive medical image data that includes image data of at least one lung, segment image data of the at least one lung from other image data, model the segmented image data using a model with a central-symmetric system of pixel-pixel interactions, and classify, using a neural network, pulmonary function as a first state or a second state based at least in part on the model.

X4. A further embodiment of the present disclosure includes a method for assessing pulmonary function, comprising: receiving medical image data that includes image data of a lung; segmenting image data of the lung from other image data; modeling the segmented image data using a model, wherein parameters of the model are tuned based on a plurality of lung states; extracting a marker from the model for each of the plurality of lung states; classifying, using a neural network, the lung as one of the plurality of states based at least in part on the extracted markers.

X5. A further embodiment of the present disclosure includes a computer aided diagnostic system, comprising: at least one data processor; at least one memory; and program code stored on the at least one memory, the program code configured to be executed by the at least one processor to cause the at least one processor to: receive medical image data that includes image data of at least one lung; segment image data of the at least one lung from other image data; model the segmented image data using a model, wherein parameters of the model are tuned based on a plurality of lung states; extract a marker from the model for each of the plurality of lung states; and classify, using a neural network, the lung as one of the plurality of states based at least in part on the extracted markers.

Yet other embodiments include the features described in any of the previous paragraphs X1, X2, X3, X4 or X5 as combined with one or more of the following aspects:

Wherein pulmonary function is impaired by an infection.

Wherein the infection is a Coronaviridae infection.

Wherein the infection is COVID-19.

Wherein the first state is low severity infection and wherein the second state is high severity infection.

Wherein the first state is non-severe infection and wherein the second state is severe infection.

Further comprising segmenting the image data of the at least one lung into healthy regions and unhealthy regions, and wherein modeling the segmented image data comprises modeling the unhealthy regions.

Further comprising segmenting the image data of the at least one lung into uninfected regions and infected regions, and wherein modeling the segmented image data comprises modeling the infected regions.

Further comprising segmenting the image data of the at least one lung into healthy regions and unhealthy regions, and wherein the segmented image data is segmented image data of the unhealthy regions.

Wherein the unhealthy regions are infected regions.

Wherein the unhealthy regions are subject to Coronaviridae infection.

Wherein the lung is subject to an infection.

Wherein the infection is a Coronaviridae infection.

Wherein the program code is further configured upon execution to cause the at least one processor to: segment the image data of the at least one lung into healthy regions and unhealthy regions, and wherein the segmented image data is segmented image data of unhealthy regions.

Wherein the program code is further configured upon execution to cause the at least one processor to: segment the image data of the at least one lung into healthy regions and unhealthy regions, and wherein modeling the segmented image data comprises modeling the unhealthy regions.

Wherein the model is at least one of translation, rotation, and scale invariant.

Wherein the model is a Markov-Gibbs Random-Field (MGRF) model.

Wherein the model is a 3D rotation invariant MGRF model.

Wherein the classifying uses a plurality of neural networks, each with different input, and a fusion neural network which uses the output of the plurality of neural networks as input.

Wherein modeling the segmented image data includes designating neighborhood sets for a plurality of different radii.

Wherein the model with the central-symmetric system of pixel-pixel interactions includes designation of neighborhood sets for a plurality of different radii.

Wherein modeling the segmented image data includes designating neighborhood sets in a MGRF model for a plurality of different radii.

Wherein the modeling further comprises determining Gibbs energy for each of the plurality of different radii.

Wherein the program code is further configured upon execution to cause the at least one processor to: determine Gibbs energy for each of the plurality of different radii.

Wherein the classifying uses a plurality of neural networks, each receiving Gibbs energy from different radii as input, and a fusion neural network which uses the output of the plurality of neural networks as input.

Wherein the neural network is a plurality of neural networks, each configured to receive Gibbs energy from different radii as input, and a fusion neural network which uses the output of the plurality of neural networks as input.

Wherein the fusion neural network outputs the classification of first state or second state.

Wherein the Gibbs energy is received as input for each of the plurality of neural networks in the form of a cumulative distribution function.

Wherein the marker is a Gibbs energy marker.

Wherein the marker is extracted from a cumulative distribution function (CDF) of the Gibbs energy marker.

Wherein the plurality of states includes a first state, a second state, and a third state.

Wherein the first state is healthy lung or mild lesion, the second state is moderate lesion, and the third state is severe lesion.

Wherein the method further comprises segmenting the image data of the at least one lung into healthy regions and unhealthy regions, and wherein modeling the segmented image data comprises modeling the unhealthy regions.

Wherein the classifying uses a back propagation neural network which uses the extracted markers as input.

The foregoing detailed description is given primarily for clearness of understanding and no unnecessary limitations are to be understood therefrom for modifications can be made by those skilled in the art upon reading this disclosure and may be made without departing from the spirit of the invention.

The invention claimed is:

1. A method for assessing pulmonary function, comprising:
   receiving medical image data that includes image data of a lung;
   segmenting the medical image data to separate the image data of the lung from other image data in the medical image data;
   modeling the segmented image data of the lung using a model, wherein parameters of the model are tuned based on a plurality of lung states;
   extracting a marker from the model for each of the plurality of lung states;
   classifying, using a neural network, the lung as one of the plurality of states based at least in part on the extracted markers;
   wherein the marker is a cumulative distribution function (CDF) of a calculated Gibbs energy.

2. The method of claim 1, wherein the model is a Markov-Gibbs Random-Field (MGRF) model.

3. The method of claim 1, wherein the model is a 3D rotation invariant MGRF model.

4. The method of claim 1, wherein the lung is subject to an infection.

5. The method of claim 4, wherein the infection is a Coronaviridae infection.

6. The method of claim 1, wherein the plurality of states includes a first state, a second state, and a third state.

7. The method of claim 6, wherein the first state is healthy lung or mild lesion, the second state is moderate lesion, and the third state is severe lesion.

8. The method of claim 1, further comprising segmenting the image data of the at least one lung into healthy regions and unhealthy regions, and wherein modeling the segmented image data of the lung comprises modeling the unhealthy regions.

9. The method of claim 1, wherein the classifying uses a back propagation neural network which uses the extracted markers as input.

10. A computer aided diagnostic system, comprising:
    at least one data processor;
    at least one memory; and
    program code stored on the at least one memory, the program code configured to be executed by the at least one processor to cause the at least one processor to:
      receive medical image data that includes image data of at least one lung;
      segment the medical image data to separate the image data of the at least one lung from other image data in the medical image data;
      model the segmented image data of the at least one lung using a model, wherein parameters of the model are tuned based on a plurality of lung states;
      extract a marker from the model for each of the plurality of lung states; and
      classify, using a neural network, the at least one lung as one of the plurality of states based at least in part on the extracted markers;
    wherein the marker is a cumulative distribution function (CDF) of a calculated Gibbs energy.

11. The system of claim 10, wherein lung is impaired by an infection.

12. The system of claim 11, wherein the infection is a Coronaviridae infection.

13. The system of claim 10, wherein the plurality of states includes a first state, a second state, and a third state.

14. The system of claim 13, wherein the first state is healthy lung or mild lesion, the second state is moderate lesion, and the third state is severe lesion.

15. The system of claim 10, wherein the program code is further configured upon execution to cause the at least one processor to:
    segment the image data of the at least one lung into healthy regions and unhealthy regions, and wherein modeling the segmented image data of the at least one lung comprises modeling the unhealthy regions.

16. The system of claim 10, wherein the classifying uses a back propagation neural network which uses the extracted markers as input.

17. The system of claim 12, wherein the model is a Markov-Gibbs Random-Field (MGRF) model.

18. The method system of claim 17, wherein the model is a 3D rotation invariant MGRF model.

* * * * *